US011703455B2

(12) United States Patent
Churchwell et al.

(10) Patent No.: US 11,703,455 B2
(45) Date of Patent: Jul. 18, 2023

(54) METHODS FOR DETERMINING VIRAL TITRE USING RAMAN SPECTROSCOPY

(71) Applicant: CELL THERAPY CATAPULT LIMITED, Great Maze Pond Greater London (GB)

(72) Inventors: John Churchwell, London (GB); Marc Olivier Baradez, London (GB); Damian Marshall, London (GB)

(73) Assignee: CELL THERAPY CATAPULT LIMITED, London (GB)

( * ) Notice: Subject to any disclaimer, the term of this patent is extended or adjusted under 35 U.S.C. 154(b) by 0 days.

(21) Appl. No.: 17/417,466

(22) PCT Filed: Dec. 23, 2019

(86) PCT No.: PCT/GB2019/053695
§ 371 (c)(1),
(2) Date: Jun. 23, 2021

(87) PCT Pub. No.: WO2020/136376
PCT Pub. Date: Jul. 2, 2020

(65) Prior Publication Data
US 2022/0018782 A1    Jan. 20, 2022

(30) Foreign Application Priority Data
Dec. 24, 2018   (GB) ..................... 1821206

(51) Int. Cl.
*G01J 3/44* (2006.01)
*G01N 21/65* (2006.01)

(52) U.S. Cl.
CPC ..... *G01N 21/65* (2013.01); *G01N 2201/1293* (2013.01)

(58) Field of Classification Search
CPC .......... G01N 21/65; G01N 2201/1293; G01N 33/56983; G01N 2201/1296;
(Continued)

(56) References Cited

U.S. PATENT DOCUMENTS

2009/0082220 A1* 3/2009 Krause ................. G01N 33/531
977/924
2010/0279886 A1   11/2010 Fauchet
(Continued)

FOREIGN PATENT DOCUMENTS

CN    105603125 A    5/2016
CN    105630743 B    5/2018
(Continued)

OTHER PUBLICATIONS

Buckley, K. and Ryder, A. G. Applications of Raman Spectroscopy in Biopharmaceutical Manufacturing: A Short Review. Applied Spectroscopy. 2017, 71(6): pp. 1085-1116.
(Continued)

*Primary Examiner* — Abdullahi Nur
(74) *Attorney, Agent, or Firm* — Christenson O'Connor Johnson Kindness, PLLC

(57) ABSTRACT

The use of Raman spectroscopy for the monitoring and assessment of viral titre is disclosed. A method of quantifying viral titre in a sample using Raman spectroscopy, comprises the steps of: (a) providing a sample and irradiating the sample with a light source; (b) measuring the total intensity of Raman scattered light within each one of a plurality of wavenumber ranges to obtain a wavenumber intensity data set for the sample, wherein the plurality of wavenumber ranges are pre-selected and are characteristic of the virus in the sample; (c) performing mathematical data processing steps on the wavenumber intensity data; and (d)
(Continued)

quantifying the viral titre based upon the output of the mathematical data processing steps.

29 Claims, 22 Drawing Sheets

(58) Field of Classification Search
CPC ........ G01N 2333/01; G01J 3/44; G06F 17/10; A61B 5/0075
See application file for complete search history.

(56) References Cited

U.S. PATENT DOCUMENTS

| | | |
|---|---|---|
| 2011/0165558 A1 | 7/2011 | Popp |
| 2012/0071352 A1* | 3/2012 | Liao ........................ G01N 21/65 435/283.1 |

FOREIGN PATENT DOCUMENTS

| | | |
|---|---|---|
| KR | 20140038213 A | 3/2014 |
| WO | 2005031301 | 4/2005 |
| WO | 2006051847 A1 | 5/2008 |
| WO | 2012019102 A2 | 2/2012 |
| WO | 2015021300 A1 | 2/2015 |

OTHER PUBLICATIONS

Lee, J. H., Kim, B. C., Oh, B. K. and Choi, J. W. Rapid and Sensitive Determination of HIV-1 Virus Based on Surface Enhanced Raman Spectroscopy. J. Biomed. Nanotechnol. 2015, 11(12): pp. 2223-2230.

Savitzky, A. and Golay, M. J. E. Smoothing and Differentiation of Data by Simplified Least Squares Procedures. Analytical Chemistry. 1964, 36 (8): pp. 1627-1639.

Barnes, R. J., Dhanoa, M. S. and Lister, S. J. Standard Normal Variate Transformation and De-trending of Near-Infrared Diffuse Reflectance Spectra. Applied Spectroscopy. 1989, 43(5): pp. 772-777.

Lieber, C. A. and Mahadevan-Jansen, A. Automated method for subtraction of fluorescence from biological Raman spectra. Applied Spectroscopy. 2003, 57(11): pp. 1363-1367.

Zhao, J., Lui, H., McLean, D. I. and Zeng, H. Automated autofluorescence background subtraction algorithm for biomedical Raman spectroscopy. Applied Spectroscopy. 2007, 61(11): pp. 1225-1232.

Koch, M., Suhr, C., Roth, B. and Meinhardt-Wollweber, M. Iterative morphological and mollifier-based baseline correction for Raman spectra. Journal of Raman Spectroscopy. 2016, 48(2): pp. 336-342.

Hu H., Bai, J. Xia, G. Zhang, W. Ma, Y. Improved Baseline Correction Method Based on Polynomial Fitting for Raman Spectroscopy. Photonic Sensors. 2018, 8(4): pp. 332-340.

Zhang, Z. M., Chen, S. and Liang, Y. Z. Baseline correction using adaptive iteratively reweighted penalized least squares. Analyst. 2010, 135(5): pp. 1138-1146.

Huang, J., Romero-Torres, S. and Moshgbar, M. Practical Considerations in Data Pre-treatment for NIR and Raman Spectroscopy. American Pharmaceutical Review. 2010.

Wold, S., Sjostrom, M and Eriksson, L. PLS-regression: a basic tool of chemometrics. Chemometrics and Intelligent Laboratory Systems 2001, 58: pp. 109-130.

Marr, B., "What Are Artificial Neural Networks—A Simple Explanation For Absolutely Anyone," <https://www.forbes.com/sites/bernardmarr/2018/09/24/what-are-artificial-neural-networks-a-simple-explanation-for-absolutely-anyone/#2c9442a91245>, published Sep. 24, 2018, 4 pages.

"A Basic introduction to Neural Networks," <http://pages.cs.wisc.edu/~bolo/shipyard/neural/local.html>, accessible on Sep. 20, 2021, 5 pages.

International Search Report and Written Opinion dated Feb. 28, 2020, issued in corresponding International Application No. PCT/GB2019/053695, filed Dec. 23, 2019, 14 pages.

Driskell, JD. et al.: Rapid and Sensitive Detection of Rotavirus Molecular Signatures Using Surface Enhanced Raman Spectroscopy. PLOS ONE. 2010, 5(4):e10222.

Moor, K. et al.: Early detection of virus infection in live human cells using Raman spectroscopy. J. Biomed. Opt. 2018, 23(9): 097001-1-097001-7.

Hoonsoo, L. et al.: Classification of cucumber green mottle mosaic virus (CGMMV) infected watermelon seeds using Raman spectroscopy. Proceedings of SPIE. 2016, vol. 9864, p. 98640D.

International Preliminary Report on Patentability dated Jun. 16, 2021, issued in corresponding International Application No. PCT/GB2019/053695, filed Dec. 23, 2019, 10 pages.

Santos, Marfran CD, et al. "Spectroscopy with computational analysis in virological studies: A decade (2006-2016)." TrAC Trends in Analytical Chemistry 97 (2017): 244-256.

Bioprocessing summit presentation by Damian Marshall: Improving Viral Manufacture through Advanced PAT. Catapult Cell and Gene Therapy, Aug. 2019, 28 pages.

Examination Report dated Apr. 16, 2021, issued in corresponding International Application No. PCT/GB2019/053695, filed Dec. 23, 2019, 2 pages.

* cited by examiner

| Variable Ranges / cm$^{-1}$ |
|---|
| 420 |
| 473-481 |
| 848-863 |
| 1001 |
| 1007-1022 |
| 1109-1134 |
| 1209-1210 |
| 1271-1274 |
| 1312-1319 |
| 1456-1461 |
| 1662-1671 |

*FIG. 5B*

| Wavenumber Range / cm-1 | Peak VIP | Integrated VIP | Integrated VIP as % of Total Integrated VIP |
|---|---|---|---|
| 1109 - 1134 | 1.9030 | 44.7182 | 24 |
| 848 - 863 | 3.1279 | 40.5701 | 21 |
| 1007-1022 | 2.6319 | 36.7527 | 19 |
| 1662 - 1671 | 1.8745 | 17.3666 | 9 |
| 473 - 481 | 1.8006 | 15.3503 | 8 |
| 1312 - 1319 | 1.5638 | 12.2383 | 6 |
| 1456 - 1461 | 1.7977 | 10.0990 | 5 |
| 1271 - 1274 | 1.6370 | 6.4248 | 3 |
| 1209 - 1210 | 1.6015 | 3.1708 | 2 |
| 420 | 1.6907 | 1.6907 | 1 |
| 1001 | 1.5333 | 1.5333 | 1 |

*FIG. 5C*

| Wavenumber | $W_1$ | $W_2$ | $W_3$ | ... | $W_n$ |
|---|---|---|---|---|---|
| Raman Spectrum Intensity | $A_1$ | $A_2$ | $A_3$ | ... | $A_n$ |

| Regression Coefficients ($\beta$) |
|---|
| $\beta_1$ |
| $\beta_2$ |
| $\beta_3$ |
| ... |
| $\beta_n$ |

$$Titer\ Prediction = (A_1 \times \beta_1) + (A_2 \times \beta_2) + (A_3 \times \beta_3) + \cdots (A_n \times \beta_n)$$

*FIG. 12*

| Variable Ranges / cm⁻¹ |
| --- |
| 420 |
| 510-517 |
| 844-863 |
| 992-1037 |
| 1057-1069 |
| 1112-1137 |
| 1182-1184 |
| 1193-1199 |
| 1333-1380 |
| 1410-1461 |
| 1583-1586 |
| 1594-1692 |

*FIG. 17B*

| Wavenumber Range /cm-1 | Peak VIP | Integrated VIP | Integrated VIP as % of Total Integrated VIP |
| --- | --- | --- | --- |
| 1594-1692 | 2.5216 | 138.2853 | 26.80 |
| 992-1037 | 6.9381 | 133.8646 | 25.94 |
| 1410-1461 | 1.6650 | 70.7048 | 13.70 |
| 1333-1380 | 1.7030 | 60.6275 | 11.75 |
| 844-863 | 2.6652 | 38.4608 | 7.45 |
| 1112-1137 | 1.7035 | 36.5806 | 7.09 |
| 1057-1069 | 1.4161 | 15.3906 | 2.98 |
| 510-517 | 1.3884 | 9.0333 | 1.75 |
| 1193-1199 | 1.1516 | 6.6665 | 1.29 |
| 1583-1586 | 1.0933 | 3.2301 | 0.63 |
| 1182-1184 | 1.0359 | 2.0611 | 0.40 |
| 420 | 1.1229 | 1.1229 | 0.22 |

*FIG. 17C*

METHODS FOR DETERMINING VIRAL TITRE USING RAMAN SPECTROSCOPY

FIELD OF THE INVENTION

The present invention relates to the use of Raman spectroscopy for the monitoring and assessment of viral titre.

BACKGROUND TO THE INVENTION

Viral vector manufacture is a crucial process step for the production of many cell and gene therapies, and the growth in this industry has resulted in an increased demand for viral vector supply. In view of this, it is important that analytical tools are available to ensure that viral vector production processes can be monitored and optimised, and that viral vector product can be quantified and characterised. Both the demand for viral vector and the cost of production places a particular importance on achieving good viral vector titres during production. Currently, physical viral titre measurements are typically carried out by standard analytical techniques, e.g. for lentiviral titre, ELISA to assess p24 or qPCR for the measurement of viral RNA, and for AAV, RT qPCR with primers targeting the ITR, are frequently used. However, these methods are time consuming, are often inaccurate and require sampling of media. As such, these methods only provide a retrospective measurement of the viral concentration. New methods for measuring viral titre are therefore needed.

Raman spectroscopy is a vibrational form of spectroscopy, which has been shown to have particular utility for process analytical technology (PAT) applications where molecular information is required. The technique is based upon the detection of wavenumber shifts in photons which have been inelastically scattered by molecules present within a sample (where the difference in wavenumber of such photons either relates to the energy lost from photons by altering the vibrational state of particular molecules from ground state to a first excited state or relates to the energy gained by photons from de-exciting molecules from an excited vibrational state to the ground state). This technique has many advantages over previously used methodologies for PAT applications, most notably the relatively weak signal that is generated by water in comparison to other systems, which facilitates bioprocess monitoring, cell culture analysis and protein analysis in solution. Raman spectroscopy has, for example, been used for variance testing and to determine the identity of raw materials and cell culture media; to characterise macromolecular products; to analyse drug formulations, batch to batch variability, contamination, degradation of media, cell densities including viable cell density and total cell density, protein structure, and protein stability; for polymer and fiber analysis; for material ID testing and for the quantification of glucose, glutamine, lactate and ammonia. Buckley and Ryder (2017) provides a review of the applicability of Raman spectroscopy.

However, conventional Raman spectroscopy is associated with the production of weak signals which has been reported to impact on its use for sensitive quantitative analysis as is often required in the biological field. Indeed, the concentration limit for detection of glucose using conventional Raman spectroscopy is reported to be 0.6 mM and for phenylalanine is reported to be 1.1 mM (Buckley and Ryder, 2017, Applied Spectroscopy, 71, p 1085-1116) (estimated to be equivalent to 0.11 mg/ml and 0.18 mg/ml, respectively). In view of this, conventional Raman spectroscopy has been used primarily in the art to assess cell culture media and cell growth, and other methods have been employed where more sensitive measurements are required, for example, to detect entities which are below the reported limits of detection for conventional Raman spectroscopy, such as viral particles. In this respect, Lee et al (2015) describes the use of Surface Enhanced Raman Spectroscopy (SERS) for the detection of HIV-1. SERS differs from conventional Raman and provides enhanced signals from molecules which are adhered to roughened metal surfaces at the nanoscale, such as Ag, Cu or Au. In Lee et al, an Au nanodot fabricated indium tin oxide substrate comprising bound anti-gp120 antibody fragments was used for the specific binding of HIV-1 virus-like particles, to ensure the generation of an enhanced signal for HIV-1 virus-like particle detection. SERS however, is associated with limitations, including the requirement to pre-prepare a substrate with an appropriate immuno-interactive molecule, which limits the generic application of the technology, and the increased cost associated with this. Further, SERS, by the nature of the requirement of binding to the entity of interest, is always invasive within a sample.

Thus, further methods are required to characterise and to assess entities which may be associated with sensitive or weak signals, such as viruses, and to assess such entities in situ.

SUMMARY OF THE INVENTION

Surprisingly, in direct contrast to the teaching in the art, the inventors have shown that conventional Raman spectroscopy can be used to accurately and sensitively quantify viral titre in situ in real-time. The inventors have shown that viral titre as determined by conventional Raman spectra is comparable to offline titre measurements (e.g. as measured by offline assays such as RT-qPCR and p24 ELISA), and that conventional Raman spectroscopy can provide an alternative rapid and reliable method to assess viral titre. As discussed previously, this finding is particularly unexpected in view of the prior art where conventional Raman spectroscopy was associated with the production of weak signals, and where the low concentration of virus in solution would have been understood to be beneath the typical lower limits of detection using conventional Raman spectroscopy, e.g. when applied to bulk solution systems, especially those with large scattering variation and in the presence of unwanted fluorescent background signals.

Particularly, the inventors have identified a series of spectral variables which are important in enabling predictions with models processing the real-time Raman spectroscopy data to achieve the measure of real-time viral titre. The inventors have established stratified ranges of increasing numbers of variables with different importance thresholds to provide variable ranges for the accurate prediction of viral titre when using Raman spectroscopy. The inventors have shown that Raman spectroscopy can be used to identify the start, production phase, and end of the viral production process.

The present invention thus relates to the use of Raman spectroscopy for the monitoring and/or assessment of viral titre in a sample. Alternatively viewed, the invention relates to a method for monitoring and/or assessing viral titre in a sample, comprising the steps of analysing a Raman spectrum of a sample comprising virus using a multivariate model and determining viral titre. Such a method may additionally comprise a step of carrying out Raman spectroscopy on the sample, i.e. to obtain the spectrum.

The present invention further specifically relates to the use of Raman spectroscopy for the monitoring and/or assessment of the start, production phase, and/or end of the viral production process. The inventors have identified that Raman spectroscopy can be used for the determination of viral titre, as discussed above, and particularly the inventors have identified specific wavenumber ranges which require assessment for this purpose. The intensity of such peaks may be determined in a method of the invention, where the intensity of such peaks may result in the production of a fingerprint which can be assessed with a multivariate model to determine viral titre. In a preferred embodiment of the invention the viral titre monitored and/or assessed is lentiviral titre.

One advantage of the present invention is that viral titre can be continuously monitored in real-time. There is no need to take samples from the culture medium to generate an estimate of viral titre, and measurements may be made in situ, if desirable. Thus, more accurate trends in viral titre can be produced, without risk of contamination. The methods of the present invention are thus faster and simpler than off-line methods. Particularly, the production stage of the culture can be much more accurately measured, leading to a more accurate timing of the end/harvesting stage of viral production, allowing process cessation at an appropriate time point, potentially reducing the cost of the production process.

Therefore, the invention provides: a method of quantifying viral titre in a sample using Raman spectroscopy, the method comprising the steps of:
 (a) providing a sample and irradiating the sample with a light source;
 (b) measuring the total intensity of Raman scattered light within each one of a plurality of wavenumber ranges to obtain a wavenumber intensity data set for the sample, wherein the plurality of wavenumber ranges are preselected and are characteristic of the virus in the sample;
 (c) performing mathematical data processing steps on the wavenumber intensity data; and
 (d) quantifying the viral titre based upon the output of the mathematical data processing steps.

In the above-defined method, the steps of performing mathematical data processing and quantifying the viral titre may comprise:
 (i) optionally normalising the wavenumber signal intensity data by pre-processing the signal intensity data using one or more pre-processing analytical methods, such as a first derivative method, a second derivative method, a standard normal variate (SNV) method, a polynomial fitting method, a multi-polynomial fitting method, a mollifier method, a piecewise polynomial fitting (PPF) method or an adaptive iteratively reweighted Penalized Least Squares (airPLS) method;
 (ii) obtaining model parameters by applying to the wavenumber signal intensity data a multivariate regression algorithm, such as a partial least squares (PLS) regression algorithm, optionally wherein the PLS algorithm is a nonlinear iterative partial least squares (NIPALS) regression algorithm or a neural network; and
 (iii) quantifying the viral titre using the model parameters obtained by applying the multivariate regression algorithm to the signal intensity data.

In any of the above-defined methods, the light source used to irradiate the sample may be a laser and the sample may be irradiated with light having a wavelength of 785 nm.

In any of the above-defined methods, the Raman scattered light may be detected using a charge-coupled device (CCD).

In one embodiment of the above-defined methods, the plurality of wavenumber ranges in the Raman spectrum which are measured may comprise 5 or more of wavenumber ranges 1 to 28 as listed in Table 1 and wherein the variable importance projection (VIP) is ≥1.00; or the plurality of wavenumber ranges in the Raman spectrum which are measured may comprise 10 or more of wavenumber ranges 1 to 28 as listed in Table 1 and wherein the VIP is ≥1.00; or the plurality of wavenumber ranges in the Raman spectrum which are measured may comprise 15 or more of wavenumber ranges 1 to 28 as listed in Table 1 and wherein the VIP is ≥1.00; or the plurality of wavenumber ranges in the Raman spectrum which are measured may comprise 20 or more of wavenumber ranges 1 to 28 as listed in Table 1 and wherein the VIP is ≥1.00; or the plurality of wavenumber ranges in the Raman spectrum which are measured may comprise 25 or more of wavenumber ranges 1 to 28 as listed in Table 1 and wherein the VIP is ≥1.00; or the plurality of wavenumber ranges in the Raman spectrum which are measured may comprise all 28 of wavenumber ranges 1 to 28 as listed in Table 1 and wherein the VIP is ≥1.00. In any of these methods, the viral titre measured may preferably be lentiviral titre.

The plurality of wavenumber ranges in the Raman spectrum which are measured may alternatively comprise 5 or more of wavenumber ranges 29 to 59 as listed in Table 1 and wherein the variable importance projection (VIP) is ≥1.25; or the plurality of wavenumber ranges in the Raman spectrum which are measured may comprise 10 or more of wavenumber ranges 29 to 59 as listed in Table 1 and wherein the VIP is ≥1.25; or the plurality of wavenumber ranges in the Raman spectrum which are measured may comprise 15 or more of wavenumber ranges 29 to 59 as listed in Table 1 and wherein the VIP is ≥1.25; or the plurality of wavenumber ranges in the Raman spectrum which are measured may comprise 20 or more of wavenumber ranges 29 to 59 as listed in Table 1 and wherein the VIP is ≥1.25; or the plurality of wavenumber ranges in the Raman spectrum which are measured may comprise 25 or more of wavenumber ranges 29 to 59 as listed in Table 1 and wherein the VIP is ≥1.25; or the plurality of wavenumber ranges in the Raman spectrum which are measured may comprise 30 of wavenumber ranges 29 to 59 as listed in Table 1 and wherein the VIP is ≥1.25; or the plurality of wavenumber ranges in the Raman spectrum which are measured may comprise all 31 of wavenumber ranges 29 to 59 as listed in Table 1 and wherein the VIP is ≥1.25. In any of these methods, the viral titre measured may preferably be lentiviral titre.

The plurality of wavenumber ranges in the Raman spectrum which are measured may alternatively comprise 5 or more of wavenumber ranges 60 to 81 as listed in Table 1 and wherein the variable importance projection (VIP) is ≥1.50; or the plurality of wavenumber ranges in the Raman spectrum which are measured may comprise 10 or more of wavenumber ranges 60 to 81 as listed in Table 1 and wherein the VIP is ≥1.50; or the plurality of wavenumber ranges in the Raman spectrum which are measured may comprise 15 or more of wavenumber ranges 60 to 81 as listed in Table 1 and wherein the VIP is ≥1.50; or the plurality of wavenumber ranges in the Raman spectrum which are measured may comprise 20 or more of wavenumber ranges 60 to 81 as listed in Table 1 and wherein the VIP is ≥1.50, or the plurality of wavenumber ranges in the Raman spectrum which are measured may comprise all 22 of wavenumber ranges 60 to 81 as listed in Table 1 and wherein the VIP is ≥1.50. In any of these methods, the viral titre measured may preferably be lentiviral titre.

In another embodiment of the above-defined methods, the plurality of wavenumber ranges in the Raman spectrum which are measured may comprise 4 or more of the wavenumber ranges 1 to 12 as listed in Table 2 and wherein the VIP is ≥1.00. The plurality of wavenumber ranges in the Raman spectrum which are measured may comprise 6 or more of the wavenumber ranges 1 to 12 as listed in Table 2 and wherein the VIP is ≥1.00. The plurality of wavenumber ranges in the Raman spectrum which are measured may comprise 8 or more of the wavenumber ranges 1 to 12 as listed in Table 2 and wherein the VIP is ≥1.00. The plurality of wavenumber ranges in the Raman spectrum which are measured may comprise 10 or more of the wavenumber ranges 1 to 12 as listed in Table 2 and wherein the VIP is ≥1.00. The plurality of wavenumber ranges in the Raman spectrum which are measured may comprise all 12 of the wavenumber ranges 1 to 12 as listed in Table 2 and wherein the VIP is ≥1.00. In any of these methods, the viral titre measured may preferably be adeno-associated viral (AAV).

The plurality of wavenumber ranges in the Raman spectrum which are measured may comprise 4 or more of the wavenumber ranges 13 to 22 as listed in Table 2 and wherein the VIP is ≥1.25. The plurality of wavenumber ranges in the Raman spectrum which are measured may comprise 6 or more of the wavenumber ranges 13 to 22 as listed in Table 2 and wherein the VIP is ≥1.25. The plurality of wavenumber ranges in the Raman spectrum which are measured may comprise 8 or more of the wavenumber ranges 13 to 22 as listed in Table 2 and wherein the VIP is ≥1.25. The plurality of wavenumber ranges in the Raman spectrum which are measured may comprise all 10 of the wavenumber ranges 13 to 22 as listed in Table 2 and wherein the VIP is ≥1.25. In any of these methods, the viral titre measured may preferably be adeno-associated viral (AAV).

The plurality of wavenumber ranges in the Raman spectrum which are measured may comprise 4 or more of the wavenumber ranges 23 to 30 as listed in Table 2 and wherein the VIP is ≥1.50. The plurality of wavenumber ranges in the Raman spectrum which are measured may comprise 6 or more of the wavenumber ranges 23 to 30 as listed in Table 2 and wherein the VIP is ≥1.50. The plurality of wavenumber ranges in the Raman spectrum which are measured may comprise all 8 of the wavenumber ranges 23 to 30 as listed in Table 2 and wherein the VIP is ≥1.50. In any of these methods, the viral titre measured may preferably be adeno-associated viral (AAV).

In any of the above-defined methods, the viral titre measured may be physical viral titre.

In any of the above-defined methods, the viral titre measured may be functional viral titre.

In any of the above-defined methods, the viral titre measured may not be the titre of HIV-1 or HIV-1 virus-like particles (HIV-1 VLPs).

In any of the above-defined methods, the sample is not processed so that virus particles to be detected within the sample are immobilised on a surface. Accordingly, in any of the above-defined methods, the virus particles are not immobilised on a surface.

In any of the above-defined methods, the Raman spectroscopy is not surface enhanced Raman spectroscopy (SERS).

In any of the above-defined methods, the sample may be a viral culture and the viral titre may be quantified from a wavenumber intensity data set obtained from the culture in situ.

In any of the above-defined methods, the sample may be a sample obtained from the culture medium of a viral culture and the viral titre may be quantified from a wavenumber intensity data set obtained from the sample.

In any of the above-defined methods, the method may comprise a first step of quantifying the viral titre in the sample at a first time point and one or more further steps of quantifying the viral titre in the sample at later time points, and the method may further comprise measuring the change in viral titre in the sample between time points, wherein each quantifying step is performed by any of the above-defined methods, preferably wherein each quantifying step is performed by the same method. In any such method the viral titre may be quantified repeatedly over a time period to provide a measure of the change in viral titre in real time. In any such method the change in viral titre in the sample may be used to determine the start phase, the production phase and/or the stationary phase of a viral production process.

In any of the above-defined methods, the method may be used to determine the optimal conditions for a viral production process.

In any of the above-defined methods, the method may be used to assess a process downstream of a viral production process.

In any of the above-defined methods, the method may comprise a step of comparing the viral titre thereby obtained with the viral titre obtained from the same sample by an alternative method, optionally wherein the alternative method is RT-qPCR or p24 ELISA.

The invention also provides a method of determining the extent of viral infection in an individual using Raman spectroscopy, the method comprising quantifying viral titre in a sample by performing any of the above-defined methods of quantifying viral titre in a sample, wherein the sample is a sample which has previously been obtained from the individual. In any such method the sample may be a sample of blood, saliva, sputum, plasma, serum, cerebrospinal fluid, urine or faeces. In any such method the viral titre in the sample from the subject may be compared with one or more viral titre measurements which have previously been obtained for the infection in the individual, in order to provide a prognosis of the stage of infection in the individual.

The invention also provides a method of quantifying viral titre in a sample using Raman spectroscopy, the method comprising the steps of:
  (a) providing a wavenumber intensity data set for the sample, wherein the data set has been obtained by irradiating the sample with a light source and measuring the total intensity of Raman scattered light within each one of a plurality of wavenumber ranges, wherein the plurality of wavenumber ranges in the Raman spectrum have been selected as characteristic of the virus in the sample;
  (b) performing mathematical data processing steps on the wavenumber intensity data; and
  (c) quantifying the viral titre based upon the output of the mathematical data processing steps.

This particular method may be performed according to the steps defined in any one of the above-defined methods of quantifying viral titre in a sample.

The invention also provides a method of building a multivariate data processing model which is capable of providing a quantification of viral titre in a sample from a Raman spectroscopy wavenumber intensity data set obtained for the sample, the method comprising:
  (a) providing the sample and irradiating the sample with a light source;

(b) measuring the total intensity of the Raman scattered light within each one of a plurality of wavenumber ranges to obtain a wavenumber intensity data set for the sample;

(c) obtaining normalised wavenumber signal intensity data by pre-processing the signal intensity data using a pre-processing analytical method, such as a first derivative method, a second derivative method, a standard normal variate (SNV) method, a polynomial fitting method, a multi-polynomial fitting method, a mollifier method, a piecewise polynomial fitting (PPF) method or an adaptive iteratively reweighted Penalized Least Squares (airPLS) method;

(d) obtaining model parameters by applying to the pre-processed signal intensity data a multivariate regression algorithm, such as a partial least squares (PLS) regression algorithm, optionally wherein the PLS algorithm is a nonlinear iterative partial least squares (NI-PALS) regression algorithm or a neural network, wherein a calibration is performed wherein the pre-processed signal intensity data are compared with viral titre data obtained for the same sample conditions using non-Raman spectroscopy methods such as qPCR and p24 ELISA;

(e) inferring response values using the model parameters obtained from the pre-processed data; and (f) performing variable selection, optionally variable importance projection (VIP), and identifying Raman spectral variables; and (g) optionally performing one or more further rounds of modelling by re-applying steps (d) to (f) and wherein unimportant variables are removed; and wherein viral titre in a sample is quantified using the model parameters obtained for the identified Raman spectral variables derived from the multivariate data processing model.

In the above-defined method of building a multivariate data processing model, the sample is not processed so that virus particles to be detected within the sample are immobilised on a surface. Accordingly, in the above-defined method of building a multivariate data processing model, the virus particles are not immobilised on a surface. In the above-defined method of building a multivariate data processing model, the Raman spectroscopy is not surface enhanced Raman spectroscopy (SERS).

The invention also provides the use of Raman spectroscopy for quantifying viral titre in a sample.

In any such use the sample may be a viral culture or a sample from a viral culture and the viral titre may be quantified based upon measurements of the intensity of Raman scattered light obtained from the sample in situ, wherein the intensity of Raman scattered light is measured from a plurality of wavenumber ranges in a Raman spectrum which are characteristic of the virus in the sample.

In any such use the viral titre in the sample may be quantified at a first time point and at one or more later time points, and wherein the change in viral titre in the sample between time points is calculated. The viral titre in the sample may be quantified repeatedly to provide a measure of the change in viral titre in real time. The viral titre in the sample may be quantified by performing any of the above-defined methods for quantifying viral titre in a sample using Raman spectroscopy.

In any such use, the sample is not processed so that virus particles to be detected within the sample are immobilised on a surface. Accordingly, in any such use, the virus particles are not immobilised on a surface. In any such use, the Raman spectroscopy is not surface enhanced Raman spectroscopy (SERS).

BRIEF DESCRIPTION OF THE FIGURES

FIG. 5 (C): Table of spectral variables with VIP>1.5 with the ranges in order of importance.

FIG. 12: shows an outline schematic of a formula for quantifying viral titre. The formula is applied to the model parameters (in this case regression coefficients) which are obtained from the multivariate regression algorithm which was applied to normalised Raman signal intensity data.

FIG. 17 (C): Table of spectral variables with VIP>=1.0 with the ranges in order of importance.

DETAILED DESCRIPTION OF THE INVENTION

Figure 1:
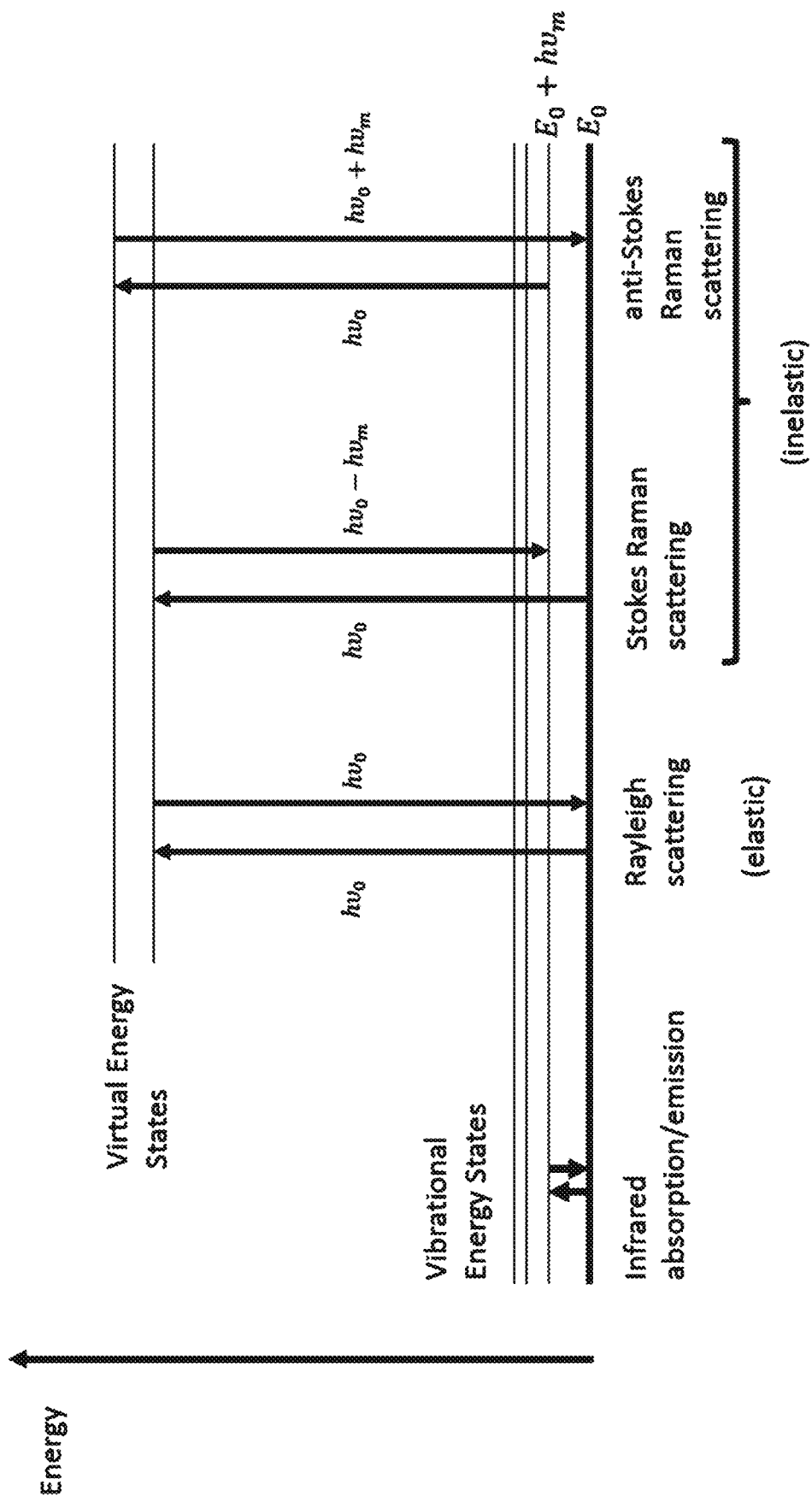
FIG. 1: Jablonski diagram showing quantum energy transitions for infrared absorption/emission. The diagram shows Rayleigh (elastic scattering) and Raman (inelastic scattering) with both Stokes and anti-Stokes transitions.

It is to be understood that different applications of the disclosed methods may be tailored to the specific needs in the art. It is also to be understood that the terminology used herein is for the purpose of describing particular embodiments of the invention only, and is not intended to be limiting.

In addition, as used in this specification and the appended claims, the singular forms "a", "an", and "the" include plural references unless the content clearly dictates otherwise.

All publications, patents and patent applications cited herein, whether supra or infra, are hereby incorporated by reference in their entirety.

Viral Titre

The present invention encompasses the use of Raman spectroscopy to monitor and assess viral titre.

"Viral titre" as defined herein refers to the quantity of virus present in a given volume. Any type of viral titre may be assessed with the present invention, e.g. physical viral titre, functional viral titre (also referred to as infectious viral titre) or transducing viral titre, may be assessed. In a particular embodiment, the physical viral titre may be assessed. Physical viral titre is a measure of the concentration of viral particles in a sample and is usually based on the presence of a viral protein, such as p24, or viral nucleic acid. Physical titre may be expressed as viral particles per mL (VP/mL), viral genomes per mL (vg/mL), viral copies per mL, or RNA copies per mL and prior art assays to measure physical titre include ELISAs for p24 (e.g. Lenti-X p24 Rapid Titer kit (Takara), or Lentivirus-Associated p24 ELISA kit (Cell Biolabs, Inc)), qPCR or ddPCR (e.g. AAV real-time PCR titration kit (Takara), or Adeno X qPCR titration kit (Takara)). Physical titre measurements do not always distinguish between empty or defective viral particles and particles capable of infecting a cell. Thus, the physical viral titre can be distinguished from functional titre or infectious titre which determines how many of the particles produced can infect cells, and the transducing viral titre which determines how many of the functional viral particles contain a gene of interest (e.g. for the production of a viral vector, the transducing viral titre may be relevant). Thus, a determination of physical titre is not equivalent to a determination of functional titre, unless all particles in a sample are functional. Indeed, functional titre is often 100 to 1000 fold less than physical titre.

Alternatively, as discussed above, the functional or infectious titre may be measured or assessed with the present invention, where functional or infectious titre is a measure of the amount of viral particles present in a particular volume which are capable of infecting a target cell. Functional titre may be expressed as plaque forming units per mL (pfu/mL) or infectious units per mL (ifu/mL). Off line assays which can be used to measure functional or infective titre include plaque assays, focus forming assays, end point dilution assays or flow cytometry. The transducing titre, as discussed above, is a measure of the amount of viral particles present in a particular volume which are capable of infecting a target cell and which comprise a gene of interest. Transducing titre may be expressed as transducing units/mL and may be assessed using the assays used to assess functional titre above, together with any known assay which can determine the presence of the gene of interest, e.g. PCR. A skilled person will appreciate that functional titre or transducing titre may be determined by scaling down any value obtained for physical titre. As discussed above, the fold differences between physical and functional or transducing titre are well understood in the art. Thus, in one aspect of the invention, functional or transducing titre may be determined indirectly by the methods of the invention (e.g. through scaling down a value obtained for physical titre). The methods of the invention may therefore include an additional step of scaling down a determination of physical titre to determine the functional or transducing titre.

It will be appreciated by a skilled person that the methods of the invention are capable of determining the viral titre of any virus of any serotype, for example, retroviruses such as lentivirus (e.g. HIV-1 and HIV-2) and gamma retrovirus; adenovirus and adeno-associated virus (e.g. AAV1-11, particularly AAV1, AAV2, AAV5 and AAV8, and self-complementary AAV). Although typically, viral titre of a single virus type may be assessed in the present invention, the methods of the invention would be capable of assessing titre of a mixed virus sample, e.g. a sample comprising two or more virus types.

In this respect, the Raman spectra produced in accordance with the present invention may either directly detect virus, indirectly detect virus or both directly and indirectly detect virus. Thus, the wavenumber peaks which are generated and shown on a Raman spectrum may be indicative of any one of a number of different compounds or molecules associated with the virus. A skilled person will appreciate that for the performance of the present invention, it is unnecessary to identify exactly which compounds/molecules each wavenumber peak identified relates to. The spectrum instead acts as a fingerprint under particular conditions (e.g. culture conditions, virus, producer cell line and type of viral titre to be measured, etc.) where viral titre can be determined by analysis of the intensity of the signal at each of the wavenumber ranges disclosed herein with a particular multivariate model (typically one that has been produced under the same or similar conditions). Multivariate models are described in more detail herein. Therefore, the peaks which are obtained for a particular Raman spectrum, at particular wavenumbers, may correspond to molecules/compounds which are viral (e.g. capsid proteins etc.), or may correspond to molecules/compounds which are non-viral (e.g. metabolites in the culture, e.g. produced by the virus producing cells). In this way, the Raman spectroscopy used in the present invention may be detecting compounds which are indirectly associated with viral titre as well as, or instead of detecting compounds which are directly associated with viral titre.

It is expected that whilst the intensity of signal at each wavenumber range may be different and may correspond differently to viral titre in Raman spectra obtained under different conditions (e.g. for producing different viruses, using different producer cell lines or with different culture media or bioreactors), the wavenumber ranges which may be assessed (e.g. which have been determined to be of relevance to viral titre), will remain the same. Furthermore, it will be appreciated that for any given set of conditions, a user will be able to create a multivariate model, based on principles described herein and known in the art, and apply this model when analysing different signal intensity data from the same wavenumber ranges described herein and which are generated subsequently using the same set of conditions. This means that the user can calculate viral titre via Raman spectroscopy using the wavenumber ranges described herein, wherein data is generated in systems to which different conditions are applied.

Lentiviral assessment of the wavenumber ranges as used herein, has identified ranges which are important in the assessment of viral titre. As lentivirus is known to be a particularly complex virus in terms of its chemical composition, it is likely that the chemical components of simpler viruses which possess a portion of the components present in lentivirus will produce relevant signals which fall within a portion of the identified wavenumber ranges (if any one or more of the wavenumber ranges directly detects the virus), e.g. at least 5 of the identified wavenumber ranges. Thus, subsets of the wavenumber ranges provided herein can be used to assess the titre of viruses other than lentivirus. Further, if one or more of the wavenumber ranges identified as correlating to viral titre indirectly detect the virus, then, as it is likely that any viral transfection will result in similar metabolomic changes in culture, such wavenumber ranges will likely be useful for the assessment of viral titre in any system.

In a particular embodiment of the invention, lentiviral titre is monitored and assessed. In one aspect, the virus may not be HIV-1 or HIV-1 virus like particles.

A "virus" is typically a small infectious agent (typically smaller than a bacterium) that is only capable of replicating inside the living cell of another organism. Viruses may have RNA or DNA-based genomes. A "virus" as used herein, refers to any virus, modified virus or viral vector. Thus, although the viral titre of any wild type virus may be assessed in accordance with the present invention, it will be appreciated that the utility of the invention may particularly extend to the assessment of viral titres of mutant or modified viruses (i.e. comprising one or more nucleic acid substitutions, insertions, deletions or translocations as compared to a wildtype or naturally occurring virus, or absent large portions of genetic material encoding for viral proteins) or viral vectors. Whilst viral vectors may be based on wild type viruses, they are generally modified as compared to wild type viruses and are commonly used to introduce genetic material into target cells (e.g. genes of therapeutic use). Viral vectors therefore have particular utility, e.g. for gene therapy, cell therapy or for other molecular applications, and their production is of enormous importance to the gene therapy and cell therapy industries. It will be well understood that for example, modifications may be made to improve safety of viral vectors for gene and/or cell therapy or to improve for example the size of gene which may be carried by the vector. Modifications that may be made to create a viral vector may include the deletion of part of a viral genome which is critical for replication, resulting in a viral vector that is capable of infecting cells but which would require the presence of a helper virus to provide missing proteins which would be required for the production of new virions. Other modifications may include modifications to lower the toxicity of the viral vector on its target cell and/or to improve stability of the virus, e.g. to reduce rearrangement of the genome.

Viral vectors may typically be produced in packaging cell lines, such as HEK293 cells, by the transduction of the packaging cell line with one of more plasmids encoding viral proteins and carrying the required genetic material. For example, for lentiviral production HEK293 cells may be transduced with one or more plasmids, e.g. 3 or 4 plasmids encoding virion proteins, such as the capsid and the reverse transcriptase and carrying the genetic material to be delivered by the vector. This is transcribed to produce the single stranded RNA viral genome and is marked by the presence of the psi sequence which ensures that the genome is subsequently packaged into the virion. Thus, particularly, lentiviral vectors may be produced by the transformation and expression of three (for second generation systems) or four (for third generation systems) plasmids in a producer cell line. Plasmids for the production of viral vectors are commercially available, e.g. Lenti-Pac and AAV Prime (GeneCopoeia).

Particularly, the titre of viral vectors which are produced by packaging cell lines may be monitored or assessed by a method of the invention. As discussed previously, it is particularly important in the gene therapy and cell therapy fields to be able to measure produced titre in a sensitive manner, e.g. so that production processes, such as production from a producer cell line, can be accurately monitored and managed. A virus therefore does not need to be fully functional or wildtype to be monitored or assessed by a method of the invention.

As discussed above, the methods of the invention can "monitor or assess" viral titre. Thus, the methods of the invention are capable of determining viral titre e.g. levels, amounts or concentration of viral particles present in a sample. Particularly, the methods can thus determine whether levels, amounts or concentration of virus increase or plateau over time (e.g. by assaying a sample at different time points), or vary (e.g. increase, decrease or are equivalent) compared to different samples (e.g. assayed at the same or equivalent time point). In this way, the methods of the invention can be used for example, to assess the efficiency of a production method of the virus e.g. where the detection or determination of a high level of virus may be indicative of an efficient method and a low level of virus may be indicative of a sub-optimal production method), or can be used to determine the importance of particular factors in the production method of the virus, for example, by comparison with viral titres measured during other modified production methods (for the same or different virus). Physical titre values which are expected to be detected by the methods described herein are in the range of $1 \times 10^{10}$ to $1 \times 10^{11}$ particles/mL. Infectious titre values which are expected to be detected by the methods described herein are in the range of $1 \times 10^8$ to $1 \times 10^9$ particles/mL. Thus, the modification of a factor which results in a difference in viral titre measured may be determined to be important to the production method (e.g. modification of a factor which results in a difference of at least 5, 10, 20, 30, 40 or 50% in viral titre measured). Such a factor could include incubation temperature, culture media used, % glucose or amino acids used in the media, the presence, absence or amount of agitation used, or the culture flask or volume used, etc.

Thus, the methods of the invention could be used to determine optimal conditions of viral production, including an assessment of different systems available for culturing the producer cells which may produce the virus, e.g. shaker flasks, Quantum system (Terumo), Ambr systems, e.g. Ambr 15 or 250 (TAP Biosystems).

The methods of the invention could further be used to assess any process downstream of the viral production process, e.g. to determine whether any such process has affected viral titre. Particularly, the methods of the invention could be used to assess purification methods which may be employed, e.g. to determine whether such purification methods have had any impact on titre, e.g. whether titre has increased, decreased or remained equivalent after such a purification as compared to the viral titre which was present in the sample before purification. The methods of the invention may further be used to assess large scale manufacture of virus, e.g. of viral vector, which may be particularly important for the manufacture of viral vectors for gene therapy.

An increase in viral titre as used herein may be an increase of more than 5, 10, 20, 30, 40, 50, 60, 70, 80 or 90% of the viral titre as to which a measurement is being compared, and a decrease in viral titre as used herein may be a decrease or more than 5, 10, 20, 30, 40, 50, 60, 70, 80 or 90% of the viral titre as to which a measurement is being compared. An equivalent viral titre may be within 5% of the viral titre to which a measurement is being compared.

In this regard, it will be appreciated that for some purposes, it may be desirable to assess viral titre prior to carrying out a method and as well as after and/or during a method, in order to determine whether any change or variation in the viral titre has occurred. The methods of the invention may further also include a step of comparison of viral titre e.g. with the viral titre within a different sample (at an equivalent or different time point), or within the same sample at a different point in time.

In a further embodiment of the invention, the methods may be used to determine the extent of viral infection in a subject, e.g. to determine whether an infection is being successfully treated or reduced. In such a method, it may be desirable to compare the viral titre in a sample, e.g. a sample of the same type from a subject at different time points, to determine whether the viral titre increases, decreases or remains equivalent over time. Alternatively, or additionally, it may be desirable to compare the viral titre in a sample from an individual with viral titre measurements which have been previously obtained for a condition and which for example may be indicative of the stage of infection and/or the prognosis.

Alternatively, the methods of the invention may not determine an actual amount, level or concentration of a virus in a sample, but may determine whether the amount, level or concentration is above or below an acceptable threshold, e.g. for a production method, the threshold may determine whether there is an acceptable level of viral particles within a sample. As discussed above, the methods of the invention may determine whether levels of viral titre are increased, decreased or comparable to those of a previously assayed sample, and thus it will be appreciated that for particular applications, it may not be necessary to determine the actual viral titre (e.g. amount or concentration of virus present).

The present invention encompasses the use of Raman spectroscopy to monitor and/or assess viral titre in a sample so that any one of the start, production phase, and end of the viral production process can be identified. It will be appreciated that different amounts or concentrations of virus and/or metabolites will be present in the sample at different stages of production. For example, at the beginning of production viral titre, particularly physical viral titre, may be in the range of $0-10^5$, during active virus production viral titre, particularly physical viral titre, may be in the range of $10^5-10^9$ and at the end of viral production, viral titre, particularly physical viral titre, may be in the range of $10^9-10^{12}$. However, generally, the monitoring of viral titre over time may identify the different phases of production for a particular virus, in for example, a particular packaging cell line, where increased or peak amounts may be associated with the production phase of the process, early low amounts may be associated with the start of the process and a later plateau in amounts may be associated with the end of the process. As previously discussed, this information can be used for a particular process to ensure that cultures are not maintained after production has plateaued, decreased (e.g. by at least 50% as compared to the peak production point) or terminated.

The methods of the present invention may also be used to support adaptive manufacturing and further to increase the viral titre production in a system. In this respect, viral titres obtained under different conditions and using different systems can be compared to determine optimal conditions for virus production.

The term "sample" as used herein refers to any sample which contains virus (e.g. any sample which comprises a viral vector). Particularly, in the present invention viral titre in a sample may be measured by Raman spectroscopy in real-time, in situ or may be carried out on samples ex situ.

By "in situ" it is meant that measurements to obtain the intensities of Raman scattered light in a culture capable of producing virus particles are taken from the primary culturing environment in which the virus particles are produced, and not from a sample extracted from the primary culturing environment. Thus, by taking measurements "in situ" there are no requirements for liquid handling steps. Thus, removal of a sample from its environment may not be necessary for particular applications of the present invention, and in situ measuring of a sample may be preferred. An in situ measurement of a sample may allow for regular assessment of viral titre in a sample without the need for an actual sampling step, where a portion of sample is removed. Viral titre assessment in this respect can be measured accurately and sensitively in real time without the need for additional steps which could introduce cost and error. As discussed below in further detail, Raman spectroscopy for example provides a probe which can either be placed within or externally to a sample, allowing in situ measurements to be taken where desirable.

Alternatively, the methods of the invention may be carried out on samples ex situ. By "ex situ" it is meant that measurements to obtain the intensities of Raman scattered light in a culture capable of producing virus particles are taken from samples extracted from the primary culturing environment in which the virus particles are produced following one or more liquid handling steps. In particular embodiments, the methods of the invention may comprise a step of sampling.

The origin of the sample used in the methods of the invention may be the cell culture in which the virus is being produced. The sample therefore may be one of culture medium (e.g. DMEM, MEM or SFII, optionally including serum, L-glutamine and/or other components), which may additionally comprise packaging cells (e.g. HEK293 cells), e.g. if taken during a viral production process, or may be a sample of virus for medical use, e.g. which requires quality testing, e.g. prior to marketing, sale or use. The sample could further be a sample from a subject (e.g. a human or mammalian subject) who is suspected of being infected by a virus, e.g. a blood, saliva, sputum, plasma, serum, cerebrospinal fluid, urine or faecal sample. Other sources of samples include from open water or public water supplies.

Raman Spectroscopy

Raman spectroscopy measures changes in the wavenumber of monochromatic light scattered by samples to provide information on their chemical composition, physical state and environment. This is possible because of the way in which the incident light photons interact with the vibrational modes that are present in the molecules that comprise the sample. These modes possess specific vibrational frequencies and scattering intensities under a set of given physical conditions and this makes it possible to quantify the amount of a given analyte of interest. Unlike infrared absorption spectroscopy where the absorption of light of different energies from a broadband light source is measured, in Raman spectroscopy the difference in energy of the monochromatic incident light to the scattered light is measured (FIG. 1); this is known as the Raman shift.

Figure 2:
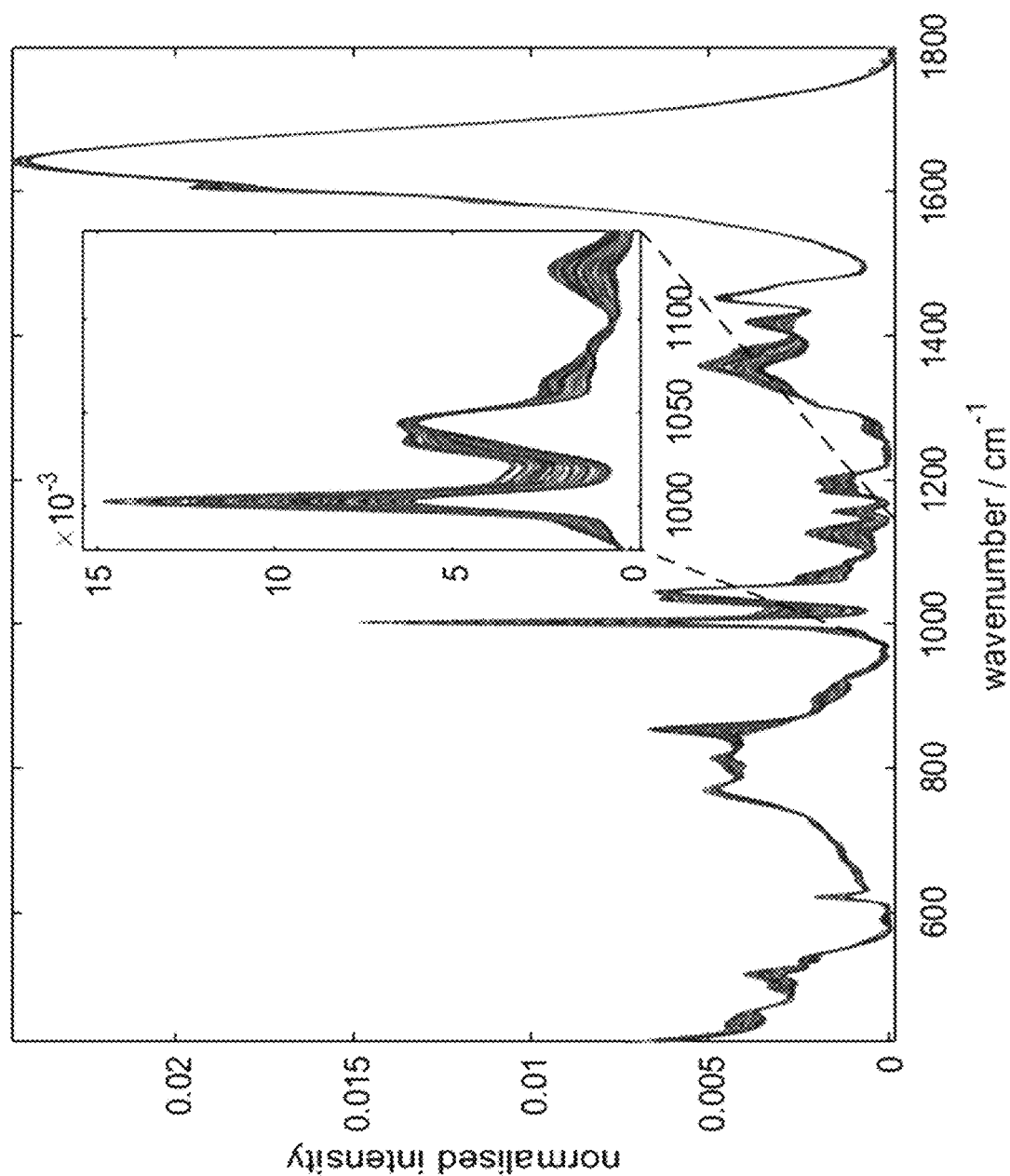
FIG. 2: Example pre-processed Raman spectra from a VV Raman Project lentiviral bioreactor run. Inset is a blow up of the 1000 $cm^{-1}$ region. Spectra were acquired for 10 seconds with 75 accumulations, for a total integration time of ~12 mins 30 s, after CCD readout time approximately 15 minutes.

Typically, the Stokes scattered light is monitored as the measured signals are more intense at ambient temperatures. FIG. 2 shows some example spectra; the different peaks represent the presence of different modes of vibration; some bands are overlapped regions of several underlying peaks. For simple mixtures it is possible to identify specific bands that are unique to n−1 of the analytes and thus measure changes in their intensity at fixed temperature and pressure to completely quantify the composition; after appropriate calibration. However, for complex systems such as biogenic media, it is not possible to rigorously apply this simple approach, there are too many overlapping bands, and this prevents direct assignment. Instead advanced chemometric models that obtain linear combinations of the variables (wavelengths/wavenumbers) that maximise the covariance with the concentration of the analyte of interest in addition to modelling the original data matrix must be used. The composition of new samples can then be predicted.

Raman spectra provide a "molecular fingerprint", enabling qualitative and quantitative analysis of samples, for example biological samples. Raman spectra are in general sensitive to changes in physical conditions such as temperature and pH. Often Raman spectra obtained from biological samples can contain background fluorescence signal as frequently such samples contain natural fluorophores. In conventional Raman spectroscopy this background should be limited by optimal laser wavenumber selection and any remaining fluorescence removed by using one of several conventionally available algorithms.

Raman spectroscopy is a technique known in the art. In the present invention real-time Raman spectroscopy may be used in-situ as discussed above, allowing for the continuous measurement of viral titre.

"Raman spectroscopy" as used herein refers to all types of Raman spectroscopy which do not require binding, e.g. immuno-interaction, between a substrate and a target molecule of interest (e.g. a molecule to be detected by Raman). Binding between a substrate and a target molecule may occur directly, or indirectly using any type of binding molecule, streptavidin/biotin etc., or antibody fragments. An "immuno-interaction" includes the use of antibodies or antibody fragments (e.g. scFvs etc) which may be attached to a substrate to specifically bind a molecule of interest in a sample. Particularly, "Raman spectroscopy" as used herein excludes surface enhanced Raman spectroscopy (SERS), e.g. SERS which requires immuno-interaction between a substrate, e.g. which may comprise metal nanodots, e.g. Au. SERS requires the analyte to be detected to be immobilised on a surface. In the method of the invention, Raman spectroscopy is not carried out to detect analytes in a sample that have been immobilised on a surface. In particular, Raman spectroscopy is not carried out to detect virus particles in a sample or from a sample that have been immobilised on a surface.

SERS is distinct from Raman Spectroscopy according to this invention, in particular SERS requires a specific experimental design to immobilise or bind the analyte of interest to a surface, which leads to an enhanced signal strength using the SERS methodology. However, such immobilisation of the analyte requires processing of the sample, which may lead to contamination or to interference with the conditions inside a bioreactor, including in situations where the sample is taken from such a system. In general, SERS is more suited to methods involving a 'simple' sample comprising the analyte of interest, with few contaminants in the sample, rather than a complex mixture of components such as found in a bioreactor or biological sample for processing viruses according to the methods defined herein. Thus, SERS is not designed for direct monitoring, or in-line or in situ monitoring of complex samples, including samples containing viral particles for the assessment of viral titre, but is instead applicable for the analysis of samples that have been processed and wherein the analyte to be detected has been purified and then immobilised on a surface.

In addition, SERS is generally known not to give reproducible results. An enhancement in the signal when using SERS is reproducible, but the magnitude of that enhancement can be quite variable. Such variability is known to occur even when pairs of SERS probe surfaces/substrates have been manufactured in highly controlled circumstances (e.g. silicon wafers etched in a clean room). This lack of reproducibility is especially a drawback for quantitative methods, such as those envisaged by the present invention.

In contrast, the methods of the invention, using Raman spectroscopy as defined herein, can detect analytes, in particular virus particles, in-line/in situ in samples without surface attachment of any analyte present in the sample, and in particular without surface attachment or immobilisation of virus particles. Accordingly the invention defined herein offers a greater degree of flexibility compared to methods involving the use of SERS.

Raman spectroscopy as defined in the present invention particularly includes conventional types of Raman spectroscopy and other types of Raman spectroscopy such as stimulated Raman spectroscopy (SRS), pico Raman, spatially offset Raman (SORS), inverse SORS, see through Raman spectroscopy, coherent anti-Stoke Raman spectroscopy (CARS), coherent Stokes Raman spectroscopy (CSRS), resonance Raman spectroscopy (RR spectroscopy) and total internal reflection Raman spectroscopy (TIR) Raman. Equipment for Raman spectroscopy can be obtained from various suppliers e.g. Renishaw, WITec, Horiba, and ThermoFisher Scientific. See also: http://www.optiqgain.com/, https://www.timegate.com/ and https://www.newport.com/.

Data Processing and Multivariate Modelling

"Multivariate" data as used herein refers to data where multiple variables are measured for each sample, and a "multivariate model" is a model built using such multivariate data. Raman spectra (e.g. generated over a time period from cell culture) comprise multivariate data, where for each sample or time point measured, intensities at multiple wavenumbers may be recorded.

In the present invention, Raman spectra and the multivariate data that comprise the spectra, resulting from in situ monitoring of viral production in culture have been analysed to identify a series of spectral variables which are the most important in enabling model predictions to achieve a measure of real-time viral titre. Plots of variable importance projection (VIP) calculated from a 10 or 12 component multivariate model were created, and the importance of the wavenumber variables established, e.g. as in relation to the data set out in Table 1. Plots of variable importance projection (VIP) calculated from a 8 or 15 component multivariate model were also created, and the importance of the wavenumber variables established e.g. as in relation to the data set out in Table 2. Thus, the inventors used multivariate data from Raman spectral measurements, together with offline data relating to viral titre from prior art assays, to identify wavenumber ranges which may be assessed when determining viral titre and to further build a multivariate model which is capable of analysing the intensity of signal at the specified wavenumber ranges from any Raman spectra achieved for a virus containing sample under particular conditions to determine viral titre. Any type of viral titre described herein can be determined using the methods of the present invention, provided that the multivariate model used to predict titre has been built using off-line data relating to the relevant type of viral titre.

In complex biological samples the unambiguous assignment of wavenumber ranges to specific analytes is often difficult or impossible. There is also an issue with low concentration of analytes, as signal may be obscured by other high concentration compounds like water or glucose in cell culture media. If the obscuring signals become too intense the noise associated with them is greater than the variation measured originating from the underlying analyte of interest and the signal intensity of the interesting component falls below the limit of detection. By analysis of Raman spectra, modelling of the data obtained, and calibration of the data with off-line measurement of viral titre, the present inventors have identified a series of wavenumber ranges that are correlated with an increase in viral titre in a sample. As these wavenumber ranges show a consistent and strong correlation over time with viral titre, it is not necessary to assign the ranges to specific analytes. Thus, the problem of a signal being obscured by high concentration compounds is not such an issue for the present methods.

In order to identify the wavenumber ranges for use in the present invention, multivariate model parameters were obtained. These parameters were then used in subsequent analysis to infer response values and to select important variables for use in calculating viral titre. In this case regression was carried out on Raman data obtained from a virus containing sample.

In this particular case the inventors performed regression on pre-processed Raman data. In this regard, it will be appreciated that often raw Raman spectral data acquired from a spectrometer may require correction for several interfering signals, such as background fluorescence and that it is often important to normalise the raw spectra acquired for a sample to correct for gross changes in absolute intensities. Thus, a skilled person would understand that it may be necessary to carry out spectral pre-processing to deal with such issues.

Pre-processing of the Raman spectra obtained may be performed using any one of many algorithms which are available in the scientific literature. Particularly, first derivative, second derivative (Savitzky et al. 1964) and standard normal variate (SNV) normalisation and polynomial background fitting and removal may for example be used. Barnes et al (1989) describe a standard normal variate method. Lieber and Mahadevan-Jansen (2003) describe an automated method for fluorescence subtraction from biological Raman spectra, based on a modification to least-squares polynomial curve fitting. Zhao et al. (2007) describe an improved automated algorithm for fluorescence removal based on modified multi-polynomial fitting. Koch et al. (2017) describe a "mollifier"-based baseline correction algorithm for pre-processing of Raman spectra. Hu et al. (2018) describe a method for baseline correction based on piecewise polynomial fitting (PPF). Zhang et al. (2010) describe an adaptive iteratively reweighted Penalized Least Squares (airPLS) algorithm method. See also Huang et al (2010).

Once steps have been taken to pre-process the Raman spectra, if required, parameters for data modelling are obtained. In this regard regression of Raman data, particularly pre-processed Raman data may be carried out based on offline responses obtained using other techniques, such as qPCR and p24 ELISA, plaque assays etc., which can determine viral titre, or CuBiAn and LC-MS which can be used to analyse metabolic markers. Regression therefore may involve comparing the pre-processed Raman spectra and the offline data. A typical approach for multivariate regression could employ partial least squares regression (PLS-R).

Specifically, in a standard orthogonal score PLS-R analysis, a linear relationship is sought between the array of Raman spectra X, and a response y (e.g. y may be a vector where each element represents a titre value for each sample:

$$y = \alpha + X\beta + E$$

where $\alpha$ and $\beta$ are unknown parameters and E is a matrix of error intensities or residuals). Different basic PLS-R algorithms may be used depending on whether y contains a single response value for each sample or several, where a PLS1 algorithm may be used for a single response value and a PLS2 algorithm may be used for multiple response values. In the case of predicting viral titre from Raman spectra, y is typically a univariate parameter for each sample and thus typically PLS1 may be used.

Briefly, a PLS1 algorithm functions as follows. Initially the variables of X and y are mean centred (the mean of each variable may be subtracted from each element in the columns of X and the mean value of y may be subtracted from each element of y. A number of underlying factors, A, may be chosen for the model, which are the factors that can be used in linear combination, to model X. In the first step, X may be projected on y to find the weights; these weights define the direction in the vector/factor space of X that has maximum covariance with y. These weights may then be normalised to have unit length. Subsequently the X scores may be computed by projecting X on these normalised weights. The X-loadings may then be computed by projecting X on the scores. Similarly, the y loadings may be calculated by projecting the transpose of y on these scores. The contribution of the current component may be removed from both X and y by deflating X and y by subtracting the contribution of the given component. This may be carried out by multiplying the component's respective score and loading vectors and subtracting the resulting array or vector from the running X array an y vector respectively. The deflated X and y may then be used again in the same way for each subsequent component in an iterative procedure. i.e. the successive determination of weights, scores and loadings until all A components are exhausted and no further deflations are carried out. Reference to this PLS method and NIPALS algorithm can be found, for example, in Wold et al. (2001).

During each iteration the calculated weight, score and loading vectors and scalars may be stored sequentially in arrays or vectors of their own i.e. for each iteration the relevant vectors or scalars may be placed as new columns or rows in arrays or elements in vectors where the existing vectors or scalars may be those obtained from previous iterations. If regression coefficients are to be used as parameters for subsequent data modelling the regression coefficients, β, may be obtained by multiplying the inverse of the projection of the transpose of the final X-block loading array on the final weights matrix. The optimum number of components may be determined by investigating the prediction error for a test set of pre-processed Raman spectra that were not used in the iterative model building procedure.

Predictions of viral titre may be made as described above using the model parameters, such as regression coefficients, β, and by comparison to offline assay data e.g. qPCR/P24 Elisa/Plaque Assay mean squared errors (MSE). The optimal number of underlying components A may be chosen when the MSE of prediction has reached a minimum.

After the building of an initial PLS-R model, e.g. using the procedure described above, the most important variables can be selected using one of many available variable selection methods, e.g. variable importance projection (VIP) which identifies the variables that may be most important in the prediction of y as well as explaining variance in X. VIP may generate a VIP vector of the same length as the rows of X, i.e. the VIP vector contains an element corresponding to each variable of X, where the numerical value of each element may be a measure of the importance of that variable. A common approach is to refine the initial model above, by rebuilding it with only the variables that are most important as determined by VIP or other variable selection method. To determine which variables are important a threshold approach is chosen. Typically, the VIP threshold may be set to 1, as this is the mean value of the VIP parameter, but a skilled person will appreciate that this is intrinsically arbitrary, and that other higher thresholds can be chosen, e.g. 1.5.

As discussed below, the wavenumber ranges identified in the present invention as being of importance for the determination of viral titre, are based on setting the VIP parameter to at least 1.00 or higher. Thus, in the present invention, wavenumber ranges which did not generate a peak intensity of greater than 1.00 at this stage were excluded.

A skilled person will appreciate that the PLS1 algorithm may be run again after selection of the VIP parameter but, in this instance, the variables of X below the VIP threshold may be removed, generating a new multivariate model, with shorter loading vectors and a shorter β vector of regression coefficients.

The wavenumber ranges set out below result from conducting Raman spectroscopy with a laser at wavelength 785 nm. It is encompassed by the present invention that lasers of different wavelengths can be used, other than 785 nm. The wavenumber ranges obtained using lasers at different wavelengths would be the same due to the Raman shift (i.e. the difference in the wavelength of the inelastically scattered Raman light from the monochromatic laser beam which is used to induce the Raman scattering) being largely independent of wavelength.

"Wavenumber" ($\tilde{v}$) as used herein is the number of wavelengths per unit distance and is measured in cm$^{-1}$. Typically, $\tilde{v}=1/\lambda$, where $\lambda$ is wavelength.

In a preferred embodiment of the invention, peaks over 1.5 (variable importance projection (VIP)) indicate wavenumber ranges likely to be important for the determination of the presence of virus and the determination of viral titre. Determining the signal intensity of specific wavenumber ranges is essential to predict viral titre by the methods of the invention. The 1.5 VIP threshold is used in an embodiment of the invention to determine which wavenumber ranges are important for the prediction of viral titre. Thus, in a preferred embodiment, the present invention encompasses a method of assessing or predicting viral titre using Raman spectroscopy comprising a step of determining from a Raman spectrum obtained from said sample, the intensity of signal at five or more of these wavenumber ranges. The measured pre-processed signals are used for the predictions. Any subsequent spectra i.e. those after model building, from which predictions are to be made require pre-processing using the exact same methods as the data used to train and build the PLS model.

Any of the methods of the present invention involve the steps of measuring the total intensity of Raman scattered light within each one of a plurality of wavenumber ranges to obtain a wavenumber intensity data set for the sample, wherein the plurality of wavenumber ranges are pre-selected and are characteristic of the virus in the sample.

In any of the methods of the invention, the plurality of wavenumber ranges in the Raman spectrum which are measured may comprise 5 or more of the wavenumber ranges 1 to 28 as listed in Table 1 below and wherein the VIP is ≥1.00. The plurality of wavenumber ranges in the Raman spectrum which are measured may comprise 10 or more of the wavenumber ranges 1 to 28 as listed in Table 1 below and wherein the VIP is ≥1.00. The plurality of wavenumber ranges in the Raman spectrum which are measured may comprise 15 or more of the wavenumber ranges 1 to 28 as listed in Table 1 below and wherein the VIP is ≥1.00. The plurality of wavenumber ranges in the Raman spectrum which are measured may comprise 20 or more of the wavenumber ranges 1 to 28 as listed in Table 1 below and wherein the VIP is ≥1.00. The plurality of wavenumber ranges in the Raman spectrum which are measured may comprise 25 or more of the wavenumber ranges 1 to 28 as listed in Table 1 below and wherein the VIP is ≥1.00. The plurality of wavenumber ranges in the Raman spectrum which are measured may comprise all 28 of the wavenumber ranges 1 to 28 as listed in Table 1 below and wherein the VIP is ≥1.00.

In any of the methods of the invention, the plurality of wavenumber ranges in the Raman spectrum which are measured may comprise 5 or more of the wavenumber ranges 29 to 59 as listed in Table 1 below and wherein the VIP is ≥1.25. The plurality of wavenumber ranges in the Raman spectrum which are measured may comprise 10 or more of the wavenumber ranges 29 to 59 as listed in Table 1 below and wherein the VIP is ≥1.25. The plurality of wavenumber ranges in the Raman spectrum which are measured may comprise 15 or more of the wavenumber ranges 29 to 59 as listed in Table 1 below and wherein the VIP is ≥1.25. The plurality of wavenumber ranges in the Raman spectrum which are measured may comprise 20 or more of the wavenumber ranges 29 to 59 as listed in Table 1 below and wherein the VIP is ≥1.25. The plurality of wavenumber ranges in the Raman spectrum which are measured may comprise 25 or more of the wavenumber ranges 29 to 59 as listed in Table 1 below and wherein the VIP is ≥1.25. The plurality of wavenumber ranges in the Raman spectrum which are measured may comprise 30 of the wavenumber ranges 29 to 59 as listed in Table 1 below and wherein the VIP is ≥1.25. The plurality of wavenumber ranges in the Raman spectrum which are measured may comprise all 31 of the wavenumber ranges 29 to 59 as listed in Table 1 below and wherein the VIP is ≥1.25.

In any of the methods of the invention, the plurality of wavenumber ranges in the Raman spectrum which are measured may comprise 5 or more of the wavenumber ranges 60 to 81 as listed in Table 1 below and wherein the VIP is ≥1.50. The plurality of wavenumber ranges in the Raman spectrum which are measured may comprise 10 or more of the wavenumber ranges 60 to 81 as listed in Table 1 below and wherein the VIP is ≥1.50. The plurality of wavenumber ranges in the Raman spectrum which are measured may comprise 15 or more of the wavenumber ranges 60 to 81 as listed in Table 1 below and wherein the VIP is ≥1.50. The plurality of wavenumber ranges in the Raman spectrum which are measured may comprise 20 or more of the wavenumber ranges 60 to 81 as listed in Table 1 below and wherein the VIP is ≥1.50. The plurality of wavenumber ranges in the Raman spectrum which are measured may comprise all 22 of the wavenumber ranges 60 to 81 as listed in Table 1 below and wherein the VIP is ≥1.50.

TABLE 1

| | Lentiviral vector production | | | | | | | |
|---|---|---|---|---|---|---|---|---|
| | VIP >= 1.00 | | | VIP >= 1.25 | | | VIP >= 1.50 | |
| # | From: | To: | # | From: | To: | # | From: | To: |
| Wavenumber Ranges/cm$^{-1}$ | | | | | | | | |
| 1 | 420 | 438 | 29 | 420 | 421 | 60 | 420 | 420 |
| 2 | 457 | 497 | 30 | 426 | 429 | 61 | 467 | 471 |
| 3 | 503 | 552 | 31 | 434 | 436 | 62 | 474 | 481 |
| 4 | 576 | 580 | 32 | 459 | 486 | 63 | 505 | 529 |
| 5 | 588 | 589 | 33 | 490 | 496 | 64 | 537 | 543 |
| 6 | 604 | 608 | 34 | 504 | 549 | 65 | 836 | 884 |
| 7 | 617 | 621 | 35 | 798 | 800 | 66 | 897 | 902 |
| 8 | 796 | 805 | 36 | 834 | 885 | 67 | 919 | 937 |
| 9 | 808 | 809 | 37 | 892 | 907 | 68 | 995 | 1043 |
| 10 | 824 | 911 | 38 | 919 | 938 | 69 | 1046 | 1046 |
| 11 | 918 | 939 | 39 | 973 | 973 | 70 | 1049 | 1071 |
| 12 | 971 | 1168 | 40 | 981 | 983 | 71 | 1084 | 1144 |
| 13 | 1191 | 1197 | 41 | 990 | 1145 | 72 | 1209 | 1210 |
| 14 | 1206 | 1212 | 42 | 1207 | 1211 | 73 | 1271 | 1273 |
| 15 | 1234 | 1237 | 43 | 1248 | 1250 | 74 | 1277 | 1302 |

TABLE 1-continued

| | Lentiviral vector production | | | | | | | |
|---|---|---|---|---|---|---|---|---|
| | VIP >= 1.00 | | | VIP >= 1.25 | | | VIP >= 1.50 | |
| # | From: | To: | # | From: | To: | # | From: | To: |
| 16 | 1246 | 1252 | 44 | 1270 | 1322 | 75 | 1347 | 1366 |
| 17 | 1259 | 1481 | 45 | 1328 | 1331 | 76 | 1386 | 1433 |
| 18 | 1497 | 1500 | 46 | 1346 | 1380 | 77 | 1444 | 1461 |
| 19 | 1526 | 1540 | 47 | 1383 | 1473 | 78 | 1467 | 1469 |
| 20 | 1545 | 1550 | 48 | 1476 | 1478 | 79 | 1610 | 1612 |
| 21 | 1584 | 1591 | 49 | 1498 | 1499 | 80 | 1629 | 1630 |
| 22 | 1598 | 1685 | 50 | 1528 | 1528 | 81 | 1655 | 1671 |
| 23 | 1699 | 1699 | 51 | 1590 | 1590 | | | |
| 24 | 1717 | 1719 | 52 | 1599 | 1602 | | | |
| 25 | 1754 | 1754 | 53 | 1609 | 1613 | | | |
| 26 | 1768 | 1771 | 54 | 1616 | 1620 | | | |
| 27 | 1782 | 1783 | 55 | 1628 | 1634 | | | |
| 28 | 1798 | 1800 | 56 | 1640 | 1672 | | | |
| | | | 57 | 1678 | 1679 | | | |
| | | | 58 | 1769 | 1769 | | | |
| | | | 59 | 1800 | 1800 | | | |

Viral titre may be measured using the plurality of wavenumber ranges in the Raman spectrum as described above in relation to Table 1. In a preferred embodiment of the invention, the viral titre measured using the plurality of wavenumber ranges in the Raman spectrum as described above in relation to Table 1 is lentiviral titre.

In another preferred embodiment of the invention, peaks over 1.5 (variable importance projection (VIP)) indicate wavenumber ranges likely to be important for the determination of the presence of virus and the determination of viral titre. Determining the signal intensity of specific wavenumber ranges is essential to predict viral titre by the methods of the invention. The 1.5 VIP threshold is used in an embodiment of the invention to determine which wavenumber ranges are important for the prediction of viral titre. Thus, in a preferred embodiment, the present invention encompasses a method of assessing or predicting viral titre using Raman spectroscopy comprising a step of determining from a Raman spectrum obtained from said sample, the intensity of signal at four or more of these wavenumber ranges. The measured pre-processed signals are used for the predictions. Any subsequent spectra i.e. those after model building, from which predictions are to be made require pre-processing using the exact same methods as the data used to train and build the PLS model.

Any of the methods of the present invention involve the steps of measuring the total intensity of Raman scattered light within each one of a plurality of wavenumber ranges to obtain a wavenumber intensity data set for the sample, wherein the plurality of wavenumber ranges are pre-selected and are characteristic of the virus in the sample.

In any of the methods of the invention, the plurality of wavenumber ranges in the Raman spectrum which are measured may comprise 4 or more of the wavenumber ranges 1 to 12 as listed in Table 2 below and wherein the VIP is ≥1.00. The plurality of wavenumber ranges in the Raman spectrum which are measured may comprise 6 or more of the wavenumber ranges 1 to 12 as listed in Table 2 below and wherein the VIP is ≥1.00. The plurality of wavenumber ranges in the Raman spectrum which are measured may comprise 8 or more of the wavenumber ranges 1 to 12 as listed in Table 2 below and wherein the VIP is ≥1.00. The plurality of wavenumber ranges in the Raman spectrum which are measured may comprise 10 or more of the wavenumber ranges 1 to 12 as listed in Table 2 below and wherein the VIP is ≥1.00. The plurality of wavenumber ranges in the Raman spectrum which are measured may comprise all 12 of the wavenumber ranges 1 to 12 as listed in Table 2 below and wherein the VIP is ≥1.00.

In any of the methods of the invention, the plurality of wavenumber ranges in the Raman spectrum which are measured may comprise 4 or more of the wavenumber ranges 13 to 22 as listed in Table 2 below and wherein the VIP is ≥1.25. The plurality of wavenumber ranges in the Raman spectrum which are measured may comprise 6 or more of the wavenumber ranges 13 to 22 as listed in Table 2 below and wherein the VIP is ≥1.25. The plurality of wavenumber ranges in the Raman spectrum which are measured may comprise 8 or more of the wavenumber ranges 13 to 22 as listed in Table 2 below and wherein the VIP is ≥1.25. The plurality of wavenumber ranges in the Raman spectrum which are measured may comprise all 10 of the wavenumber ranges 13 to 22 as listed in Table 2 below and wherein the VIP is ≥1.25.

In any of the methods of the invention, the plurality of wavenumber ranges in the Raman spectrum which are measured may comprise 4 or more of the wavenumber ranges 23 to 30 as listed in Table 2 below and wherein the VIP is ≥1.50. The plurality of wavenumber ranges in the Raman spectrum which are measured may comprise 6 or more of the wavenumber ranges 23 to 30 as listed in Table 2 below and wherein the VIP is ≥1.50. The plurality of wavenumber ranges in the Raman spectrum which are measured may comprise all 8 of the wavenumber ranges 23 to 30 as listed in Table 2 below and wherein the VIP is ≥1.50.

TABLE 2

| | AAV vector production | | | | | | | |
|---|---|---|---|---|---|---|---|---|
| | VIP >= 1.00 | | VIP >= 1.25 | | | VIP >= 1.50 | | |
| | # | From: | To: | # | From: | To: | # | From: | To: |
| Wavenumber Ranges/cm$^{-1}$ | 1 | 420 | 420 | 13 | 512 | 515 | 23 | 848 | 861 |
| | 2 | 510 | 517 | 14 | 846 | 862 | 24 | 994 | 1035 |
| | 3 | 844 | 863 | 15 | 993 | 1036 | 25 | 1119 | 1129 |
| | 4 | 992 | 1037 | 16 | 1060 | 1066 | 26 | 1355 | 1363 |
| | 5 | 1057 | 1069 | 17 | 1115 | 1134 | 27 | 1425 | 1431 |
| | 6 | 1112 | 1137 | 18 | 1352 | 1376 | 28 | 1597 | 1608 |
| | 7 | 1182 | 1184 | 19 | 1415 | 1455 | 29 | 1638 | 1644 |
| | 8 | 1193 | 1199 | 20 | 1596 | 1611 | 30 | 1652 | 1658 |
| | 9 | 1333 | 1380 | 21 | 1626 | 1626 | | | |
| | 10 | 1410 | 1461 | 22 | 1635 | 1678 | | | |
| | 11 | 1583 | 1586 | | | | | | |
| | 12 | 1594 | 1692 | | | | | | |

Viral titre may be measured using the plurality of wavenumber ranges in the Raman spectrum as described above in relation to Table 2. In a preferred embodiment of the invention, the viral titre measured using the plurality of wavenumber ranges in the Raman spectrum as described above in relation to Table 2 is adeno associated virus (AAV) titre. In a particularly preferred embodiment of the invention, the viral titre measured using the plurality of wavenumber ranges in the Raman spectrum as described above in relation to Table 2 is adeno associated virus serotype 8 (AAV8) titre.

The step of determining the intensity of signal at each desired wavenumber range requires a determination of the level of any peak identified within the desired wavenumber range. It will be appreciated by a skilled person that the intensity of signal within any wavenumber range deemed to be associated with viral titre, as set out above, may be at any level, and that the measurement of such intensities when analysed with an appropriate multivariate model will allow the determination of viral titre. As discussed in further detail below, the present invention may therefore include a step of assessing or calculating viral titre by analysing the signal intensities measured using a multivariate model. Such a multivariate model may be prepared in advance of carrying out the present invention or alternatively as part of the methods of the invention, where the methods may additionally comprise a step of building a multivariate model.

The methods of the invention may comprise determining the signal intensity at further wavenumber ranges in addition to the wavelength ranges specified herein.

Neural networks may also be used for classifications based on Raman spectra, for example in analysing diseased tissue vs healthy tissue in pathology. Neural networks may also be used for regression problems, like those faced in applying Raman data for the monitoring of viral production, as described herein.

More sophisticated approaches utilize what are referred to as convolutional neural networks (CNN) (Deep Learning), often using Google's TensorFlow backend and the Keras API for scripting in the object-oriented Python programming language. The advantage of using the convolutional layers is that pre-processing becomes less and less necessary as the network essentially "learns" the perfect way to pre-process the spectra themselves for optimal titre/concentration predictions. Such neural networks for use in the data processing steps described herein are well known to persons skilled in the art. Further information can be found e.g. here:

https://www.forbes.com/sites/bernardmarr/2018/09/24/what-are-artificial-neural-networks-a-simple-explanation-for-absolutely-anyone/#2c9442a91245 http://pages.cs.wisc.edu/~bolo/shipyard/neural/local.html

As discussed above, multivariate data model parameters may be obtained and used in methods for the quantification of viral titre as defined herein. Such model parameters may also be used in building alternative multivariate data models as defined herein if required.

The present inventors have applied a multivariate algorithm to Raman spectral wavenumber signal intensity data to obtain model parameters which are then used in the quantification of viral titre. Specifically, the inventors have applied a multivariate algorithm to obtain regression coefficients which are used as the model parameters. The skilled person will however appreciate that alternative model parameters may be obtained and used depending upon the nature of the model selected. Thus, in any of the methods defined herein multivariate data model parameters may be appropriately selected and may optionally comprise regression coefficients. Any suitable multivariate algorithm may be applied to Raman spectral wavenumber signal intensity data to obtain model parameters. A multivariate regression algorithm may be used, such as a partial least squares (PLS) regression algorithm, optionally wherein the PLS algorithm is a nonlinear iterative partial least squares (NIPALS) regression algorithm. An algorithm involving a neural network may also be used to obtain model parameters.

Model to Estimate Viral Titre

Chemometric modelling of Raman spectra was carried out as described herein to identify a correlation between increases in real-time viral titre and the identity and intensity of wavenumber ranges seen in Raman spectra. The wavenumber ranges identified are described above.

As discussed previously, the present invention requires the assessment of signal intensities at 4 or 5 or more of the wavenumber ranges determined to be of importance in the assessment of viral titre, and the further analysis of the intensities using a multivariate model (either a calibrated on non-calibrated multivariate model) which has been built.

A skilled person will appreciate that different multivariate models may be built depending on the samples to be analysed, and methods for building of multivariate models are well known in the art (e.g. see references cited herein). Thus, different multivariate models may be required for the determination of viral titre in samples which comprise different types of virus, different cell culture media or different producer cells, for example.

In one embodiment of the invention, a multivariate model can be built using the following approach:
  i) Regression of pre-processed Raman data on offline responses obtained using other techniques such as qPCR and p24 ELISA, Plaque Assay etc, as discussed above, regression may involve comparing pre-processed Raman spectra,
  ii) Using the regression coefficients obtained to predict the response values using the pre-processed data, where the quality of these predictions can be optimised by adjusting the underlying number of components/factors used for the multivariate regression,
  iii) Performing Variable Selection using any known methods, e.g. variable importance projection (VIP) which identifies variables that are powerful/important for predicting Y in addition to explaining X,
  iv) Building a Refined Model where following the identification of important spectral variables, a further round of modelling may be performed using the same approach as described in step (ii) but where the variables or columns in the array of pre-processed Raman spectra that were deemed irrelevant by variable selection are removed before the model is built. This results in a simpler model built on data with much of the irrelevant variation removed. As in (ii) the number of underlying components may be optimised by selecting the model built with the fewest number of underlying factors with, give component to component variation, the lowest error of prediction.
  v) Making Future predictions using the regression coefficients used determined in (iv), where new pre-processed Raman spectra may be multiplied by the regression coefficients obtained to generate the estimate.

It will be appreciated that it may not be necessary to repeat steps (i) to (iii) as set out above once wavenumber ranges for analysis have been identified. Particularly, building a model may only require step iv) in this instance. Furthermore, data modelling parameters other than regression coefficients may be used.

In a further aspect of the invention, the methods may comprise an additional step of preparing or building a multivariate model.

As set out in step v) above, the regression coefficients from the multivariate models generated may be used to obtain an estimate for viral titre from Raman spectra obtained from one or more samples. Thus, in the present invention, the method may include a step of determining viral titre using the regression coefficients from a multivariate model. The same pre-processing methods used for the training/building of the model.

The present invention is further illustrated by the following examples which should not be construed as further limiting. The contents of all figures and all references, patents and published patent applications cited throughout this application are expressly incorporated herein by reference.

EXAMPLES

Example 1—Calculation of Concentration of Lentivirus at Different Stages During the Production Process Calculations were performed to provide estimated lentiviral concentrations in mg/ml expected at different stages during an example viral production process. The concentrations were calculated using the known buoyant density of lentivirus and the physical titre. The results are shown in the table below.

| Parameter | Value | Units | Comments |
|---|---|---|---|
| Buoyant Density | 1.15E+00 | g/cm$^3$ | Actual range is 1.15 - 1.19 g/ml using the lower value for conservative estimate. |
| Particle Radius | 7.50E−08 | m | |
| Particle Diameter | 1.50E−07 | m | Diameter of a lentivirus is approximately 0.15-0.2 microns, using the lower value for a conservative estimate. |
| Volume of a Particle | 1.77E−21 | m$^3$ | 4/3 × pi × r$^3$ |
| Volume of a particle | 1.77E−15 | cm$^3$ | |
| Mass of a Particle | 2.03E−15 | g | |
| Typical Physical Titre (a) | 1.00E+08 | particles/ml | physical titres 100-1000 × greater than copy number from qPCR. |
| Typical Physical Titre (b) | 1.00E+07 | particles/ml | |
| Typical Physical Titre (c) | 1.00E+09 | particles/ml | |
| Typical Physical Titre (d) | 1.00E+10 | particles/ml | |
| Concentration (a) | 2.03E−07 | g/ml | |
| Concentration (b) | 2.03E−08 | g/ml | |
| Concentration (c) | 2.03E−06 | g/ml | |
| Concentration (d) | 2.03E−05 | g/ml | |
| Concentration (a) | 2.03E−04 | mg/ml | |
| Concentration (b) | 2.03E−05 | mg/ml | |
| Concentration (c) | 2.03E−03 | mg/ml | |
| Concentration (d) | 2.03E−02 | mg/ml | |

As shown, estimated lentiviral concentrations were found to be in the range of 2.03E-02 to 2.03E-05 mg/ml.

For comparison purposes, shown below are some instructive calculations based on the limit of detection for glucose and phenylalanine as taken from Buckley and Ryder (2017, Applied Spectroscopy, 71, p 1085-1116).

Glucose
mw=180.156 g/mol
limit of detection 0.6 mM (see Buckley and Ryder)
moles=volume/1000*molarity
1/1000*0.0006—in 1 ml
=0.0000006 moles
mass=moles*mw
=0.0000006*180.156

=0.00011 g/ml
Estimated concentration=0.11 mg/ml.
Phenylalanine
mw=165.19 g/mol
LoD=1.1 mM (See Buckley and Ryder paper)
moles=volume/1000*molarity
1/1000*0.0011—in 1 ml
=0.0000011 moles
mass=moles*mw
=0.0000011 moles*165.19 g/moles
=0.00018 g
Estimated concentration=0.18 mg/ml.

The concentrations in mg/ml for the limits of detection for glucose and phenylalanine are 5-10 times higher than the optimistic estimated concentrations commensurate with the conservative physical titres.

Based on the above, it would be expected that the approximate concentration in mg/mL of lentivirus in the culture medium would be below what would be considered the limit of detection using Raman spectroscopy.

Example 2—Lentiviral Production from a HEK 293 Transient Process

Experimental Methods
Cell Culture and Transient Transfection
HEK293 cultures were expanded in Eppendorf DASbox BioBLU 300 bioreactors in FreeStyle 293 expression medium (ThermoFisher) with no additional supplements at 37° C. The cells were agitated and were expanded for 2 days prior to transient transfection to produce lentivirus. The cells were transfected with gag-pol,vsv-g and genome encoding eGFP to produce LV particles using PEIPro from Polyplus.

Throughout the process 10 or 12 samples were acquired from each bioreactor to measure viral titre using qRT-PCR and confirmed by P24 ELISA. Raman spectra were acquired throughout the expansion and viral production phases.

RT-qPCR
PCR kit Used: Lenti-X™ qRT-PCR Titration Kit (by Takara, Cat #631235)
Suppliers: Clontech
Method of action: the kit is a one-step reverse transcription and PCR amplification kit. The primers of this kit target a conserved region of the HIV-1 genome adjacent to the packaging signal. Amplicons are detected by SYBR green fluorescence and the final titre determined from a ssRNA standard used to generate the standard curve. Final quantification of virus titre is provided as viral genomes/ml.

P24-ELISA
ELISA kit: QuickTiter™ Lentivirus Titer Kit (Lentivirus-Associated HIV p24) (Cat # VPK-107)
Suppliers: Cell Biolabs, Inc
Method of action: the kit is an enzyme immunoassay developed for detection and quantification of the lentivirus associated HIV-1 p24 core proteins only. Virus associated p24 can be quantified as p24 titre (ng/ml) or as particles/ml with the assumption there are approximately 2000 molecules of p24 per lentiviral particle.

Raman Spectroscopy
Raman measurements were performed using a Kasier Optics RxN2 Raman spectrometer. This spectrometer has the capacity to monitor 4 probe channels sequentially. The RxN2 excitation source was a 785 nm near infrared diode laser with a nominal power output of ~270 mW at each probe head. The samples comprised the contents of four Eppendorf, dasBox BioBLU single use systems. The beam was delivered to each sample bioreactor using four Kaiser Optics filtered fibre optic MR probes and BioOptic 220's—one set for each bioreactor. Prior to in-process measurements, the RxN2 system was stabilised for 1 hour and then each of the 4 probe channels was calibrated using the RxN2's internal auto-calibration standards, in addition, a CCD sensitivity correction was performed on each probe channel using a National Institute of Standards and Technology (NIST) certified light source (HCA). The scattered light was collected using the same BioOptic 220's and MR probes as those used for beam delivery. Within each MR probe the scattered light was delivered via a second fibre optic to the RxN2 f\1.8 imaging spectrograph. After filtering Rayleigh scattered light using a holographic notch filter, the Raman scattered light was directed to a Kaiser Optics holographic transmission grating and then imaged onto the thermoelectrically cooled 1024 pixel CCD detector. The system has an effective bandwidth of 100-3425 $cm^{-1}$ and resolution of 4 $cm^{-1}$. Raman spectra were acquired from 100-3425 $cm^{-1}$ with an integration time of ~15 minutes/channel including CCD readout time, 10 s acquisitions were averaged over 75 accumulations to generate each measured spectrum. Each channel was measured in turn. At different times throughout the processes, liquid samples were obtained from each bioreactor and the time point noted to enable the post hoc matching of the offline assay data to the commensurate Raman spectra.

Raman Data Analysis
All data analysis was performed in MATLAB (The MathWorks, MA, USA) version R2017b. Raw Raman spectra were pre-processed by normalising the entire spectrum to the peak intensity of the water band at 3000 $cm^{-1}$. The moderate fluorescence background signal was removed for the region of 420-1800 $cm^{-1}$. The low end of this range was selected to avoid Raman bands that could originate from the sapphire window of the BioOptic-220 or be artefacts of the optical design of the Raman instrument and probes. The reduced normalised spectra were then inspected for obvious outliers and artefacts. The spectra associated with the offline sampling time points were identified and a model training subset of pre-processed spectra created. The training set of pre-processed spectra were then used for chemometric modelling. The spectra were mean-centered prior to chemometric modelling. Several initial projections to latent structures-regression (PLS-R) models for critical analytes and viral titre were built. These models allow you to regress multivariate Raman spectra against samples containing known concentrations of interesting analytes (viral titre). Based on these calculations the concentration of the analytes can be predicted in future. The models were prepared using a 10-fold cross validation procedure on the training data, i.e. $\frac{1}{10}^{th}$ of the data was randomly selected and removed from the training data and used to assess model performance, this was done 10 times and the error values, model accuracy/performance statistics are the averages obtained for each of the 10-fold training sets. Choosing the number of underlying components or basis vectors is an important step in building supervised linear models such as PLS-R. In this work the optimal number of underlying components was identified by examining plots of the mean squared error of prediction after cross-validation (MSECV) as a function of component number; a minimum identifies the optimal number of PLS components. A second stage of variable selection is required to optimise the models built by choosing only wavenumbers/variables that are most significant for prediction. This was carried out using the Variable Importance Projection (VIP) method. However, many methods of conducting variables selection exist. A typical VIP plot is shown in FIG. 5.

Typically, variables with VIP values greater than 1 are used for the final model. However, here we have built and assessed models using several VIP thresholds to identify the minimum number of spectral variables required to make good predictions and the threshold at which one ceases to be able to model the offline RT-qPCR data. As the VIP threshold is increased the number of spectral variables identified decreases. Once the significant variables were determined for each VIP threshold, final models were built. Subsequently these models were used to predict the intermediate viral titre values, i.e. those between each offline data point for all available runs.

Preliminary Viral Titre Model Evaluation and Range Selection

Example, pre-processed Raman spectra as used for chemometric modelling are shown in FIG. 2.

Figure 3:
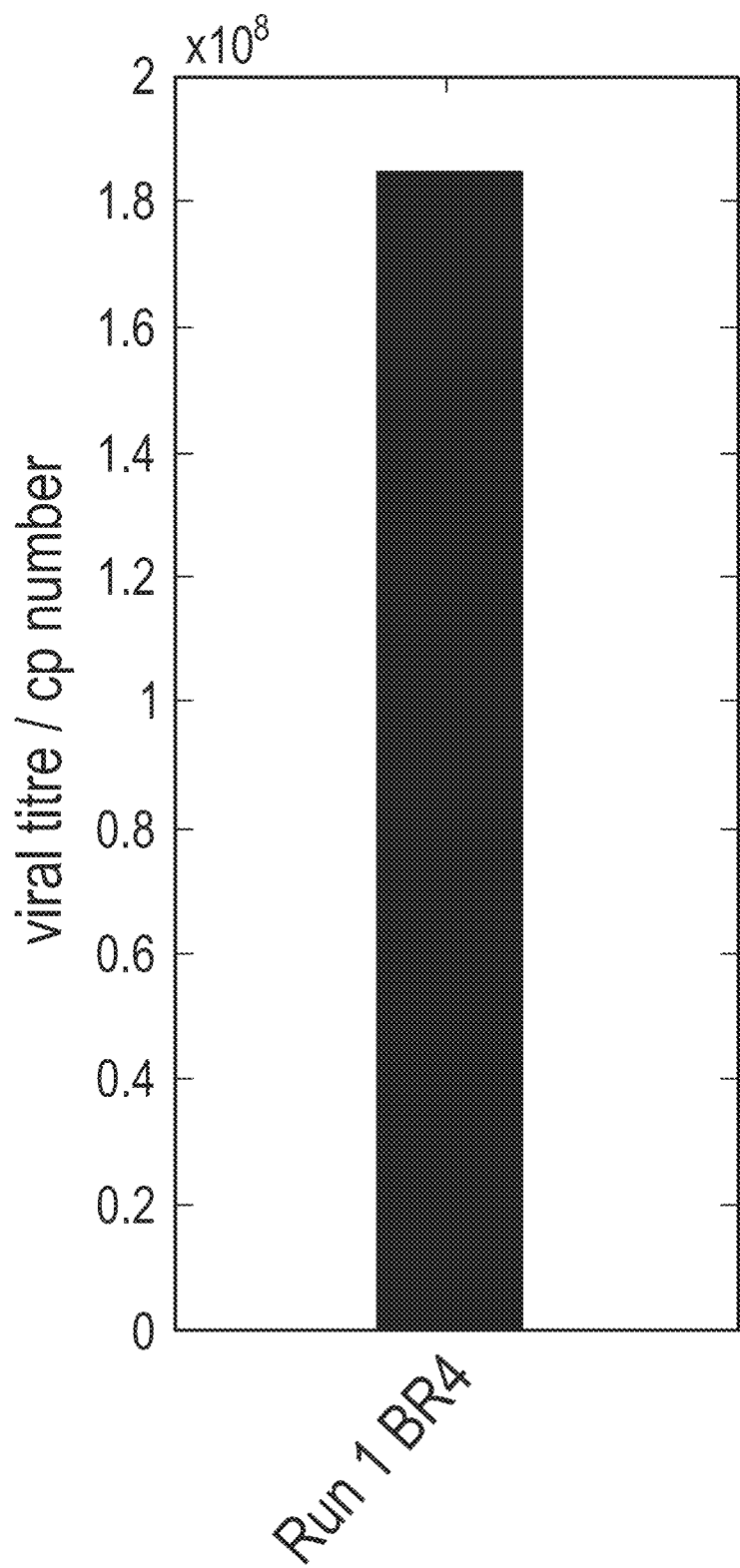
FIG. 3: Bar chart showing representative qPCR lentiviral titre results for bioreactor transfection in the viral vector Raman project, cp number=copy number.

Viral titre was monitored throughout the project, a representative titre obtained by RT-qPCR is summarised in FIG. 3.

Figure 4:
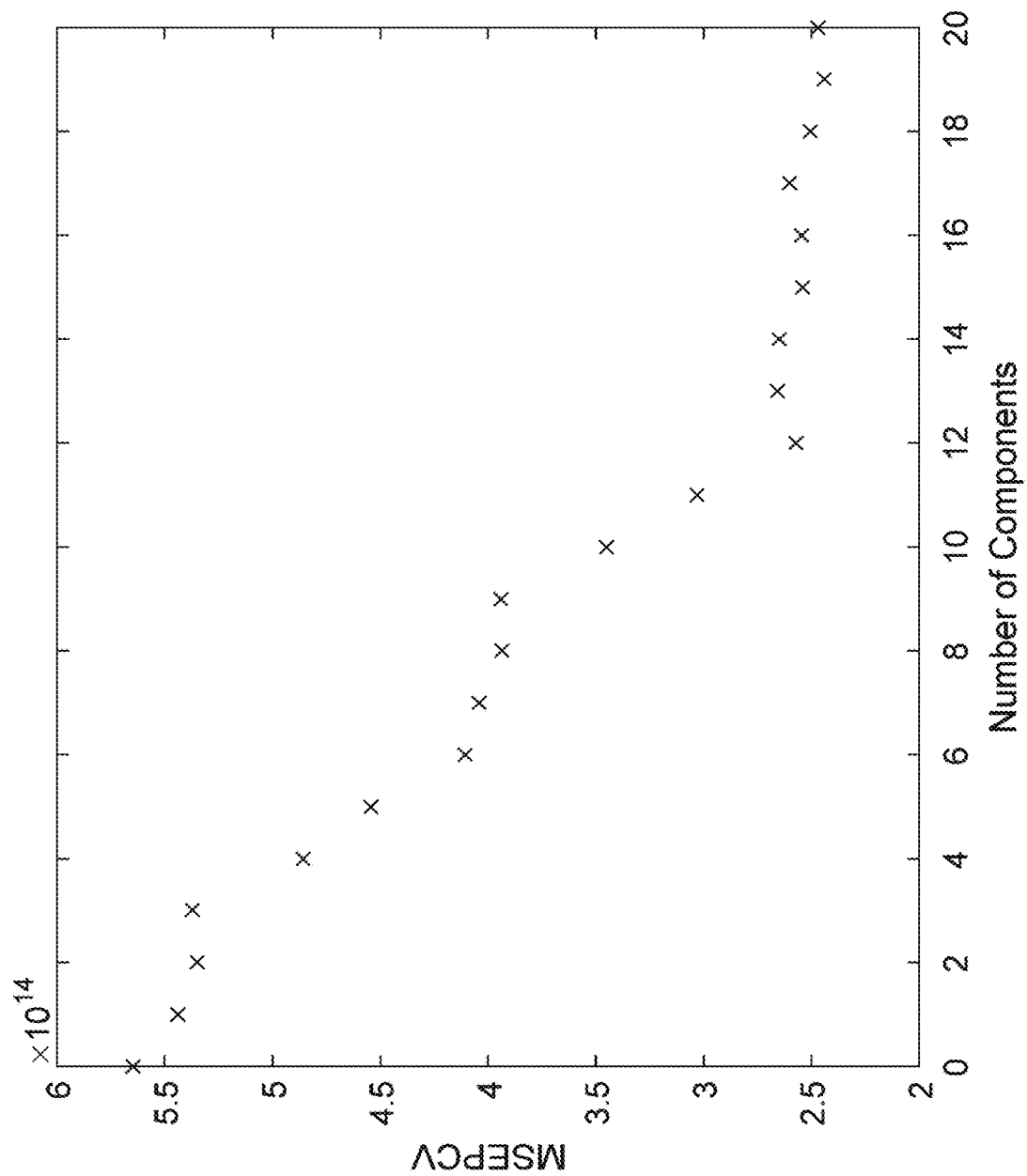
FIG. 4: A graph showing how the mean squared error of prediction (MSEPCV) after 10 fold cross validation and 20 monte carlo repeats varies as a function of the number of PLS latent variables/components (prior to spectral variable selection).

A Plot of the mean squared error of prediction after cross-validation for the initial PLS-R model is shown in FIG. 4. When using all spectral variables or channels, the minimal effective prediction error was found to occur when 12 PLS components were used.

From this plot (FIG. 4) it therefore can be concluded that the best compromise between prediction error minimization and model simplicity lies in a 12-component model. A small improvement in predictive power could be obtained by increasing the number of components but this is likely just the result of incorporating noise and overfitting the model to the training set. That is, building a model that is only predictive for the training data and not new unseen data and is based on spurious correlations between the measured variables and the dependent/response variables.

Figure 5A:
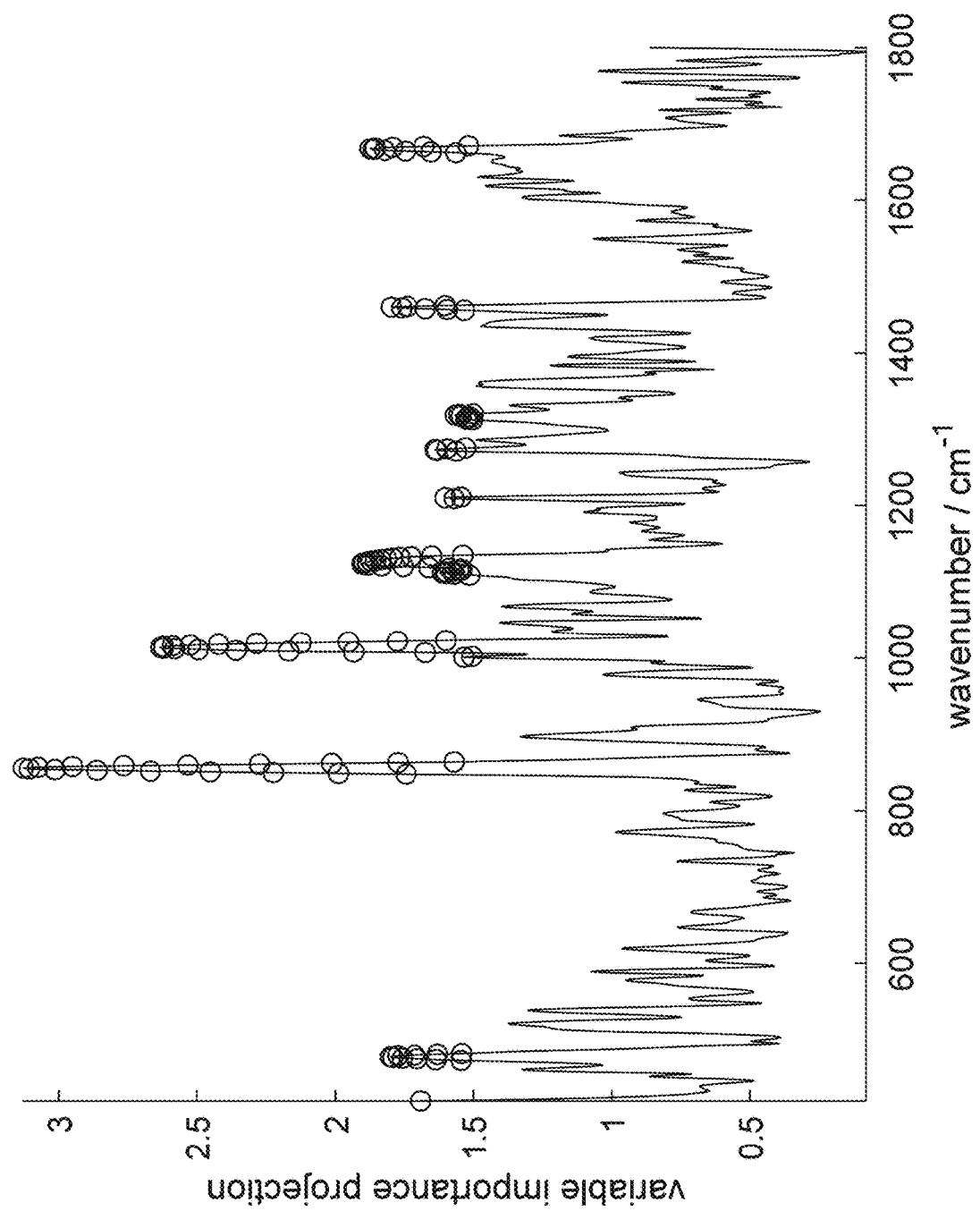
FIG. 5 (A): A plot of variable importance projection (VIP) calculated from the initial 10 component PLS-R model. The circles indicate spectral variables with VIP>1.5 and this information was used to determine the ranges shown in FIG. 5 (B).

Following preparation of the initial 12 component model different variable selection methods were evaluated to select the optimal/most predictive spectral variables for the final model. The aim here was to remove unnecessary spectral channels/variables from the model to enhance its parsimony and only include physically meaningful information. The variable importance projection (VIP) was finally calculated to determine which spectral variables have the greatest importance in predicting the viral copy number (FIG. 5A). To assess and identify the minimum number of spectral variables required to make acceptable physical titre predictions, several variable importance thresholds were investigated as the criterion for retained variables; generally, a VIP threshold of 1 is used—thresholds of 1.00-1.75 were investigated. FIG. 5B shows variable or wavenumber ranges that the VIP algorithm identifies as regions considered most important i.e. those greater than a selected threshold, in this case 1.5, FIG. 5C shows these wavenumber ranges in order of importance.

Figure 6:
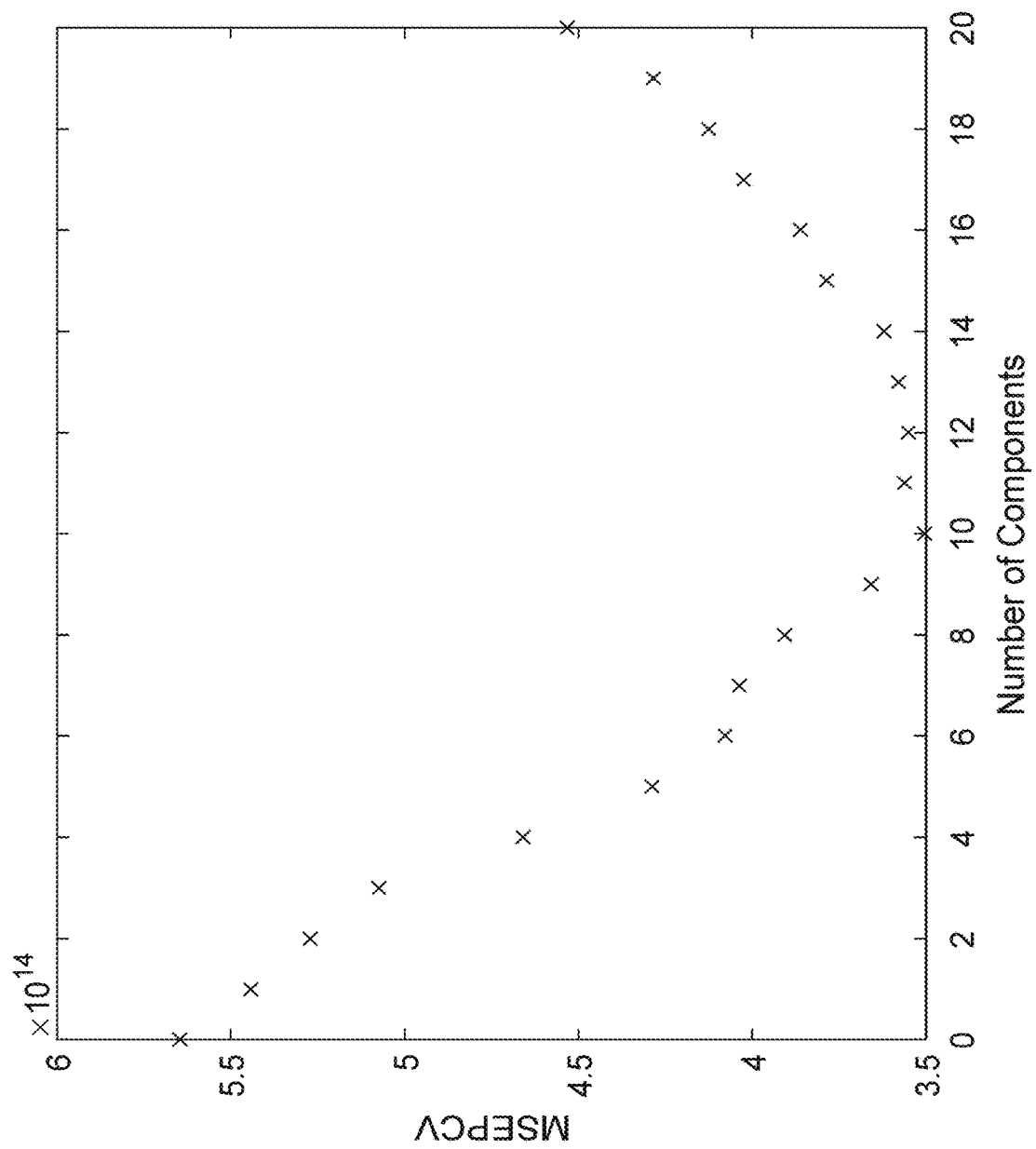
FIG. 6: A plot showing the change in the mean squared error of prediction after cross-validation as a function of latent variable or component number. Obtained after conservative spectral variable reduction using VIP>1.5.

After the number of spectral variables was reduced a further assessment of the number of underlying latent variables was carried out. The optimal number of PLS components can vary with the number of spectral variables or wavenumbers that are used in the model. After spectral variable reduction using a threshold of 1.5 the optimum number of PLS latent variables was found to be 10. FIG. 6 shows the MSECV plot for the refined models with different numbers of underlying components. The fact that the mean squared error of prediction increased with larger numbers of underlying components indicates that where more than 10 PLS components were included the models produced were overfitting the training set.

Figure 7:
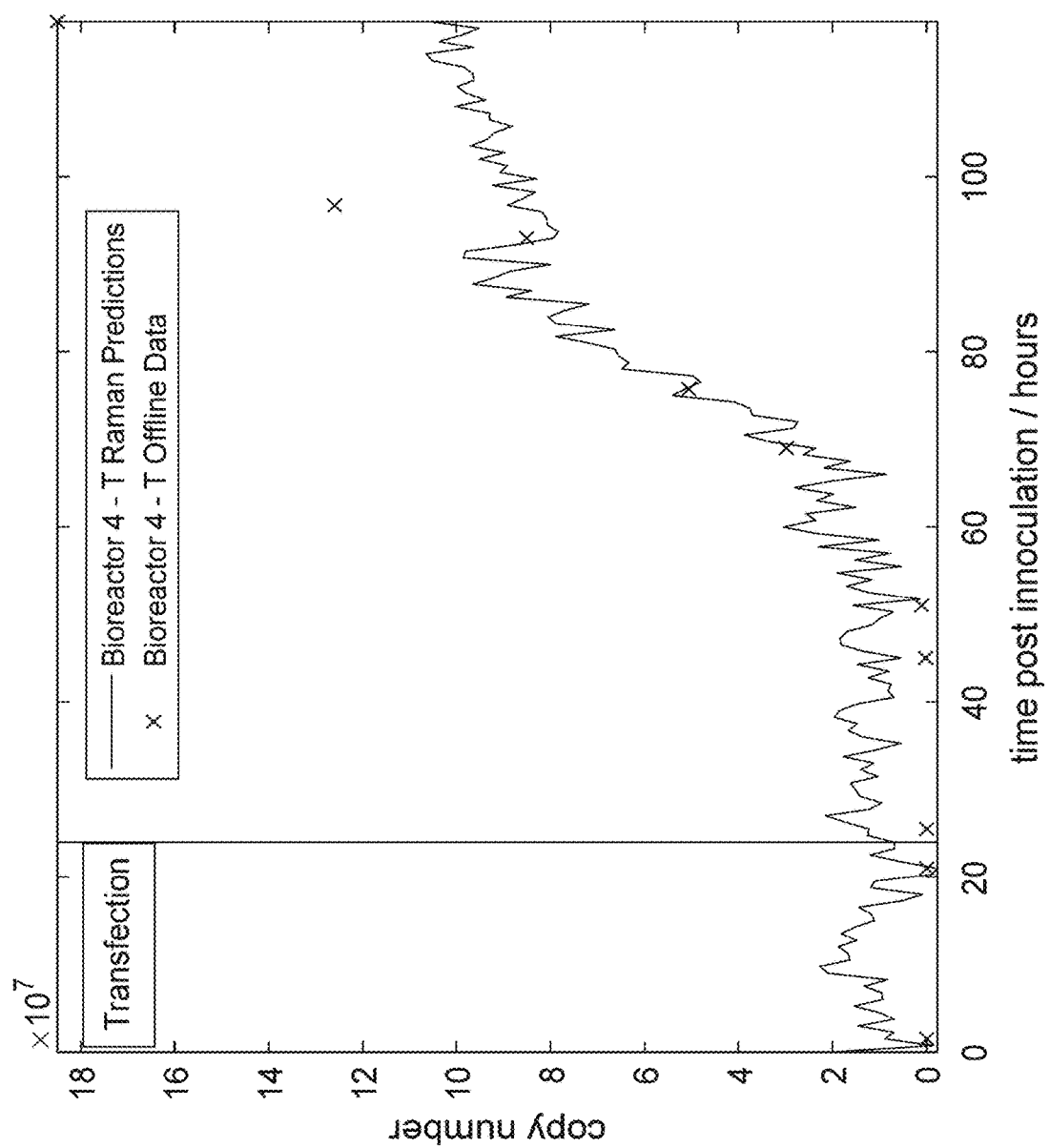
FIG. 7: A plot showing the Raman copy number/mL PLS-R predictions (10 LV) from lentiviral run 1 bioreactor 4 following spectral variable reduction (VIP>1.5) alongside the offline qPCR data. T means "transfected" and NT means "not transfected".
Figure 8:
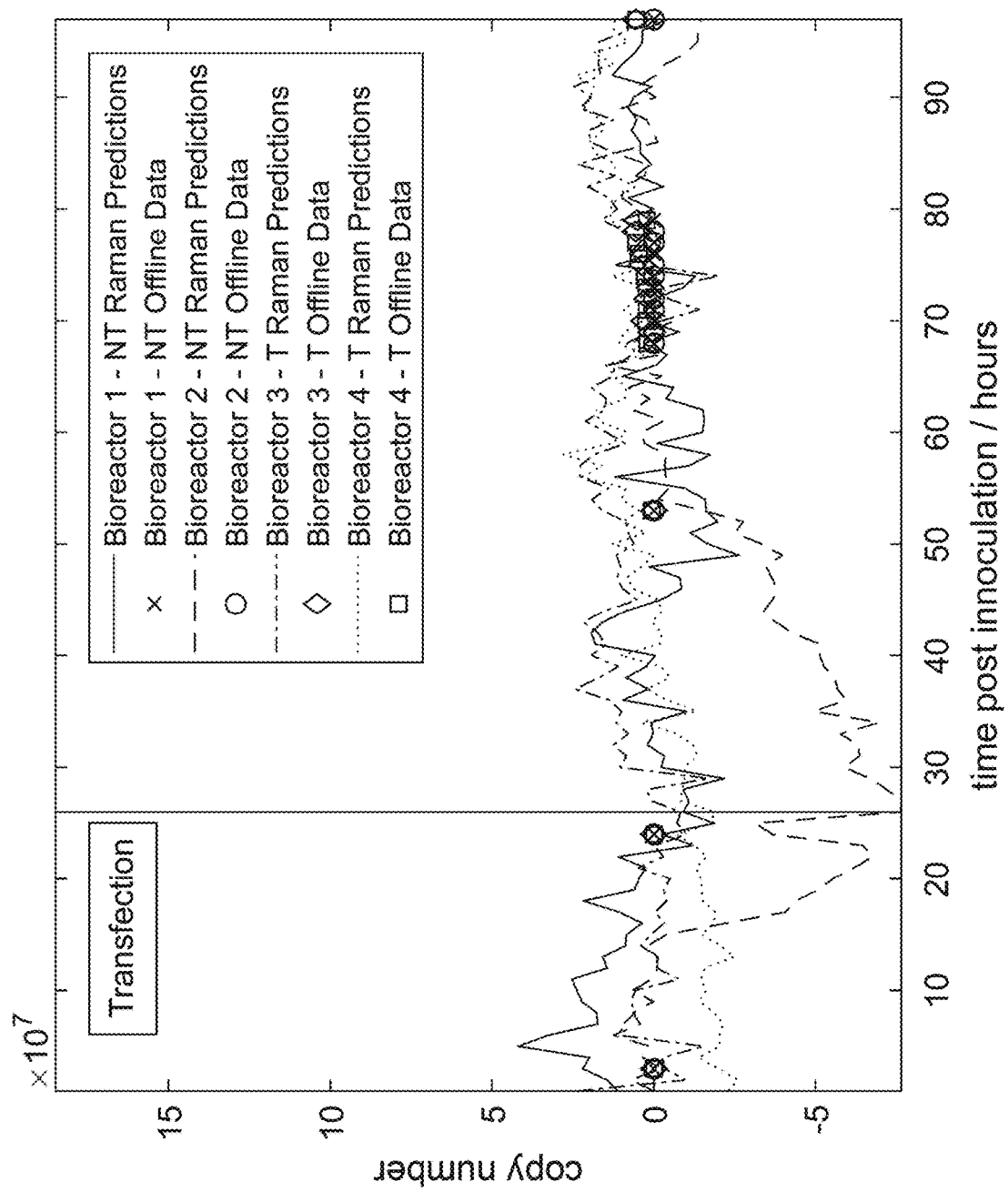
FIG. 8: A plot showing the Raman copy number PLS-R predictions (10 LV) from lentiviral run 2 bioreactors 1-4 following spectral variable reduction (VIP>1.5) alongside the offline qPCR data.
Figure 9:
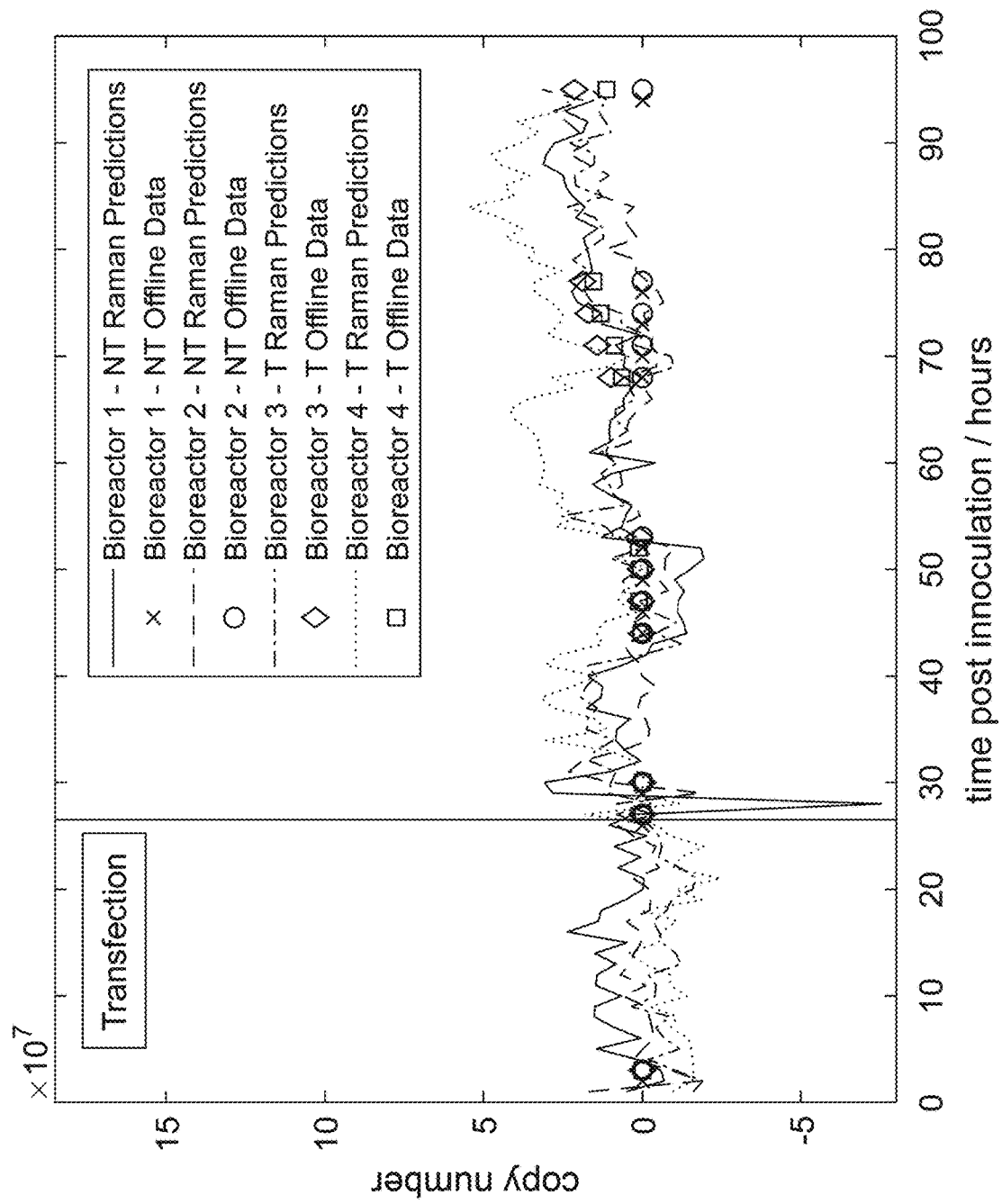
FIG. 9: A plot showing the Raman copy number PLS-R predictions (10 LV) from lentiviral run 3 bioreactors 1-4 following spectral variable reduction alongside the offline qPCR data.
Figure 10:
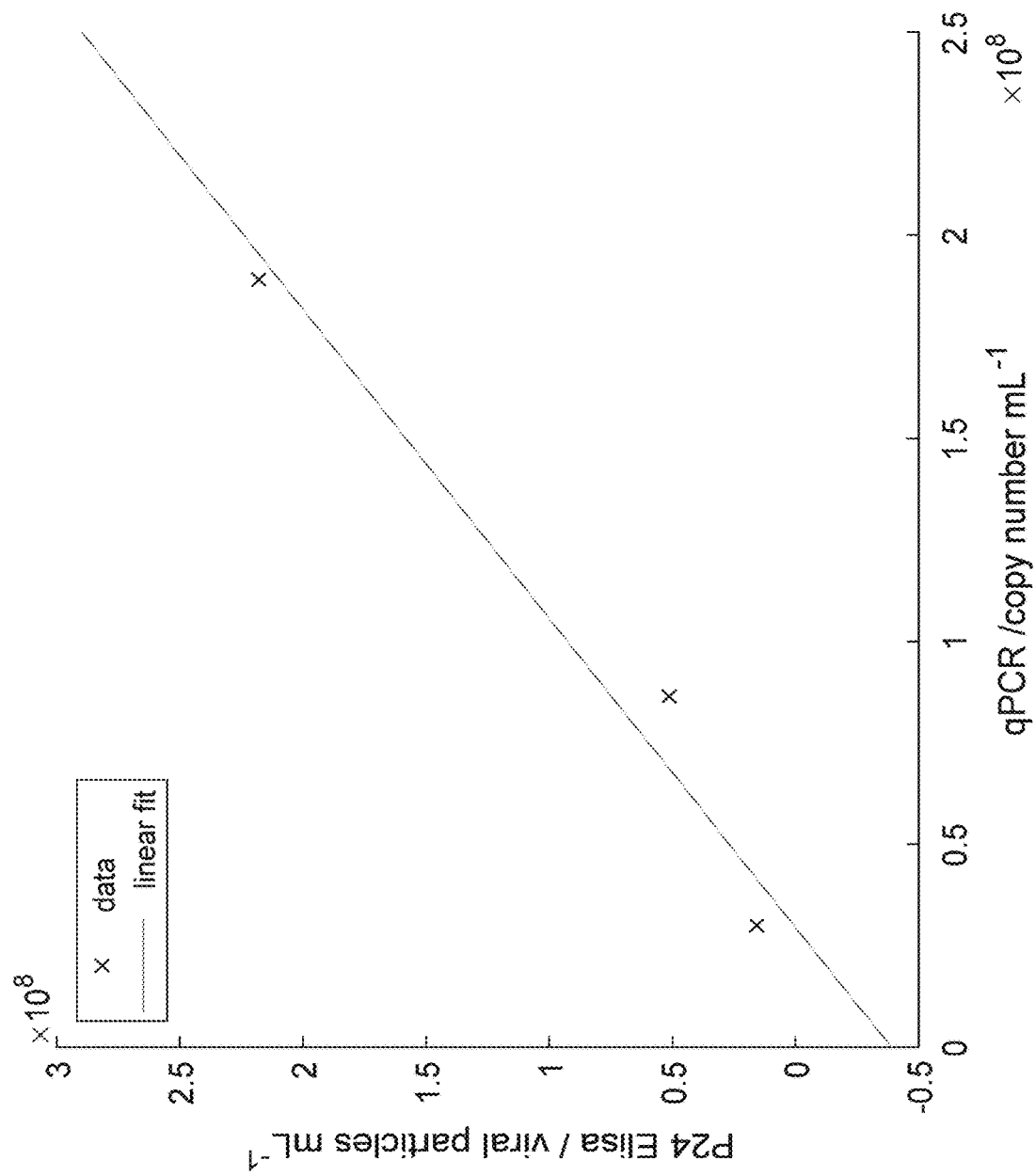
FIG. 10: Comparison RT-qPCR and p24 ELISA Results. The p24 ELISA assay was only used to obtain lentiviral titre on a few of the offline samples.

Model predictions of RT-qPCR viral copy number for each of the 3 runs estimated using the regression coefficients obtained from the 10-latent variable and VIP>=1.5 selected spectral variable (conservative) model are shown below in FIGS. 7, 8 and 9 respectively. The results show that the model using the Raman spectroscopy data is consistent with offline measurements of viral titre over time. A comparison of the titres obtained from the RT-qPCR assay and P24 ELISA are shown in FIG. 10.

Figure 11:
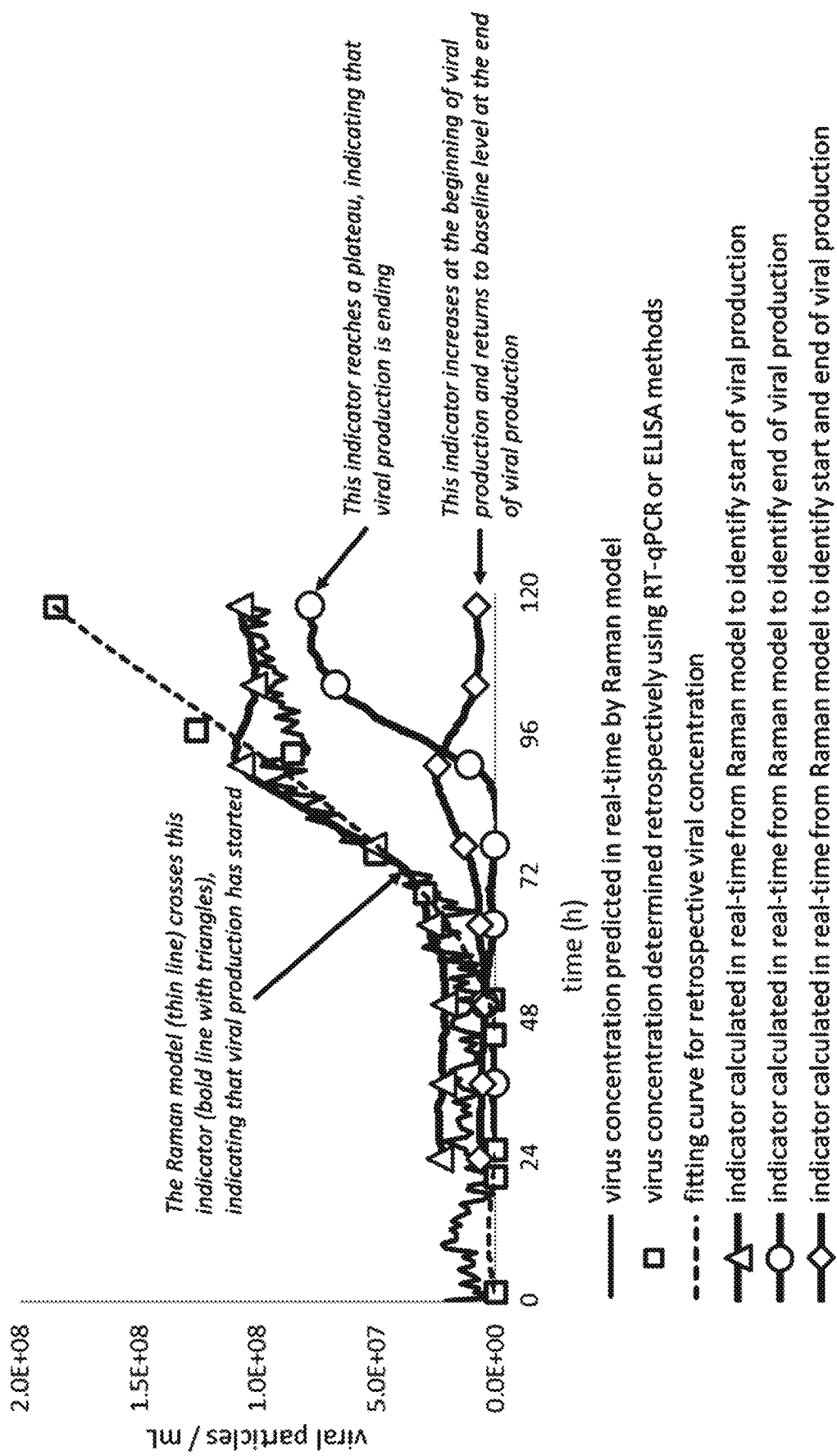
FIG. 11: Example of application of real-time Raman-derived model of viral titre to identify the start, production phase, and end of the viral production process. From the model (solid black line), a set of 3 indicators are calculated also in real-time. Together with the model estimation of the viral titre, the shape of the indicator curves inform on the various stages of the virus production (as explained in the text overlaid to the graph). The physical titre, calculated retrospectively using either RT-qPCR and/or ELISA methods, is overlaid to the graph (squares and dashed line) to show the overall agreement between real-time data and retrospective off line data. The inclusion of additional peaks from the Raman spectra can improve the quality of the Raman model, but this plot was generated using the minimum number of regions required to identify the main phases of viral production.

FIG. 11 describes how the methods of the present invention can be used to monitor the stage of a viral production culture. As Raman spectroscopy is used in real-time, in a continuous manner, in the methods of the invention changes in the production rate of virus can be accurately followed. Thus, the change from start to production phase, and production phase to end phase, can be identified.

Example 3—Refined Viral Titre Model Evaluation and Range Selection

Further studies using additional samples were performed using the same methodologies as described above for Example 2 in order to further refine the wavenumber range selection for viral titre evaluation. Using this approach various wavenumber ranges were identified for use in calculating viral titre by applying a variable importance projection (VIP) threshold of ≥1.00. Additional wavenumber ranges were identified by applying a variable importance projection (VIP) threshold of ≥1.25 and further wavenumber ranges were identified for by applying a variable importance projection (VIP) threshold of ≥1.50. The results are presented in Table 1 above.

FIG. 12 shows an outline schematic of a formula for quantifying viral titre. The formula is applied to the regression coefficients which are obtained from the multivariate regression algorithm which was applied to normalised Raman signal intensity data.

A further analysis was performed to analyse the number of wavenumber ranges which can be used to provide an accurate estimate of viral titre.

The ranges identified as important for viral vector production, i.e. the ranges identified as important by variable importance projection (VIP)≥1.00 after initial PLS modelling using the extended spectral range (~420-1800 cm-1), were identified (i.e. wavenumber ranges 1 to 28 as listed in Table 1 above) and further analysis was performed.

The data were split into randomly selected paired blocks of training and test data in a 4:1 ratio, that is Raman spectra and their associated offline viral titre data for model building (80%) and model testing (20%).

Figure 13:
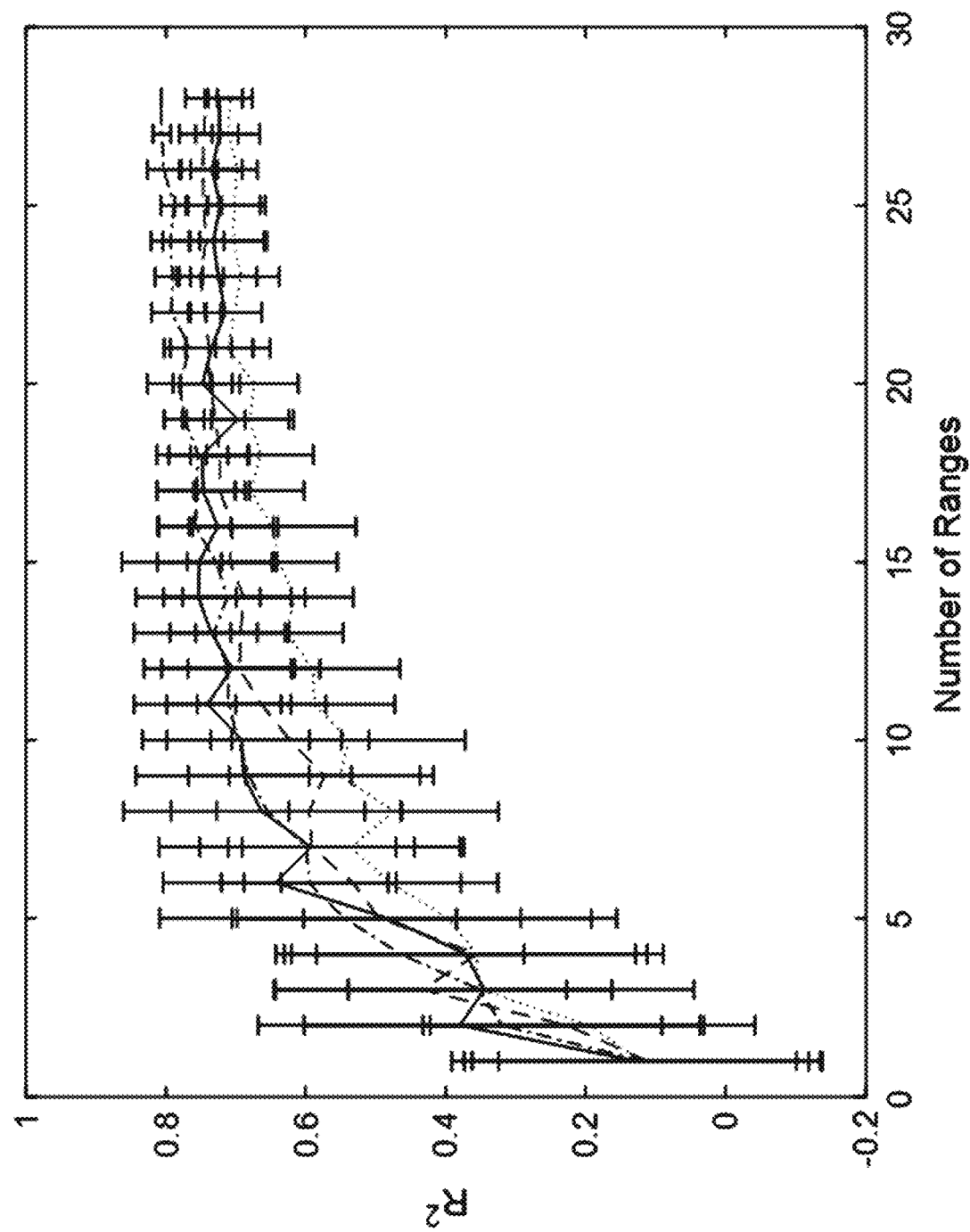
FIG. 13: shows a plot of $R^2$ (1−residual sum of squares/total sum of squares) as a function of the number of wavenumber ranges to demonstrate the minimum number of wavenumber ranges which are required to provide an estimate of lentiviral titre.

Different combinations of the ranges deemed important by VIP were evaluated stochastically for the different training and test pairs, i.e. for each r total number of ranges 1-28, many combinations were evaluated based on the model performance $R^2$ statistic (n.b. $R^2$=1−residual sum of squares/total sum of squares) and the standard deviations of the different models' performances was evaluated to generate the confidence intervals. The minimum number of ranges was identified by choosing the number of ranges where the mean of mean $R^2$ values for several training/test pairs of data was approximately 0.5. FIG. 13 shows a plot of $R^2$ as a function of the number of wavenumber ranges.

This analysis identified five as being the minimum number of wavenumber ranges which are required to provide an estimate of viral titre.

Thus, in any of the methods of the invention, 5 or more of wavenumber ranges 1 to 28 as presented in Table 1 identified at a VIP threshold of ≥1.00 may be used to calculate viral titre, as described in more detail herein. In any of the methods of the invention, preferably 5 or more of wavenumber ranges 29 to 59 as presented in Table 1 identified at a VIP threshold of ≥1.25 may be used to calculate viral titre, as described in more detail herein. In any of the methods of the invention, more preferably 5 or more of wavenumber ranges 60 to 81 as presented in Table 1 identified at a VIP threshold of ≥1.50 may be used to calculate viral titre, as described in more detail herein. In any of these methods, preferably 10 or more of the wavenumber ranges may be used to calculate viral titre as described in more detail herein, more preferably 15 or more, or yet more preferably 20 or more.

Example 4 —AAV8 Production from a HEK 293 Transient Process

Experimental Methods
Cell Culture and Transient Transfection
HEK 293F cultures were expanded in Eppendorf DASbox BioBLU 300 bioreactors in BalanCD media (Irvine Scientific) with 4 mM GlutaMAX (Fisher) at 37° C. The cells were agitated and were expanded for 24 hours prior to transient transfection to produce AAV8. The cells were transfected with rep, cap, genome encoded eGFP plasmids and helper plasmid (E2A, E4) in serum-free Opti-MEM (Gibco) to produce AAV8 particles with PEIPro (Polyplus transfection).

Throughout the process 12 samples were acquired from each bioreactor to measure viral titre using qRT-PCR. Raman spectra were acquired throughout the expansion and viral production phases.

RT-qPCR
Viral titre of AAV8 samples was measured using TaqMan™ based real-time qPCR, with final quantification provided as viral genome/mL (VG/mL). The primers of the assay targeted the ITR2 sequences in the AAV8 viral genome. Amplicons were detected by TaqMan™ fluorogenic probe. Viral titre was determined from a standard curve generated from a linearised plasmid.

Raman Spectroscopy
Raman measurements were performed using a Kasier Optics RxN2 Raman spectrometer. This spectrometer has the capacity to monitor 4 probe channels sequentially. The RxN2 excitation source was a 785 nm near infrared diode laser with a nominal power output of ~270 mW at each probe head. The samples comprised the contents of four Eppendorf, dasBox BioBLU single use systems. The beam was delivered to each sample bioreactor using four Kaiser Optics filtered fibre optic MR probes and BioOptic 220's—one set for each bioreactor. Prior to in-process measurements, the RxN2 system was stabilised for 1 hour and then each of the 4 probe channels was calibrated using the RxN2's internal auto-calibration standards, in addition, a CCD sensitivity correction was performed on each probe channel using a National Institute of Standards and Technology (NIST) certified light source (HCA). The scattered light was collected using the same BioOptic 220's and MR probes as those used for beam delivery. Within each MR probe the scattered light was delivered via a second fibre optic to the RxN2 f\1.8 imaging spectrograph. After filtering Rayleigh scattered light using a holographic notch filter, the Raman scattered light was directed to a Kaiser Optics holographic transmission grating and then imaged onto the thermoelectrically cooled 1024 pixel CCD detector. The system has an effective bandwidth of 100-3425 cm$^{-1}$ and resolution of 4 cm$^{-1}$. Raman spectra were acquired from 100-3425 cm$^{-1}$ with an integration time of ~15 minutes/channel including CCD readout time, 10 s acquisitions were averaged over 75 accumulations to generate each measured spectrum. Each channel was measured in turn. At different times throughout the processes, liquid samples were obtained from each bioreactor and the time point noted to enable the post hoc matching of the offline assay data to the commensurate Raman spectra.

Figure 18:
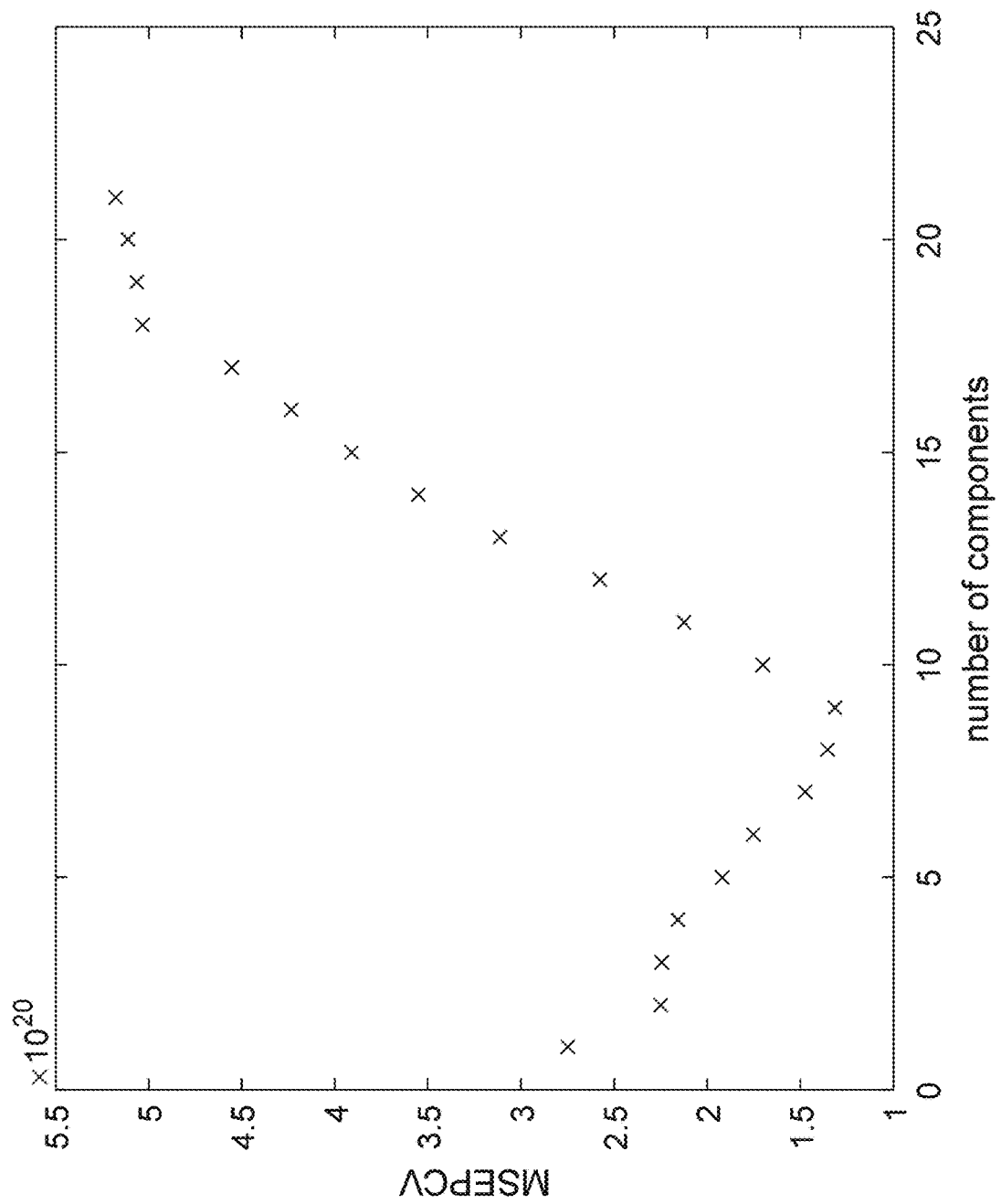
FIG. 18: A plot showing the change in the mean squared error of prediction after cross-validation as a function of latent variable or component number. Obtained after spectral variable reduction using VIP>=1.0.

Raman Data Analysis
All data analysis was performed in MATLAB (The MathWorks, MA, USA) version R2019b. Raw Raman spectra were pre-processed by normalising the entire spectrum to the peak intensity of the water band at ~3000 cm$^{-1}$. The moderate fluorescence background signal was removed for the region of 420-1800 cm$^{-1}$. The low end of this range was selected to avoid Raman bands that could originate from the sapphire window of the BioOptic-220 or be artefacts of the optical design of the Raman instrument and probes. The reduced normalised spectra were then inspected for obvious outliers and artefacts. The spectra associated with the offline sampling time points were identified and a model training subset of pre-processed spectra created. The training set of pre-processed spectra were then used for chemometric modelling. The spectra were mean-centered prior to chemometric modelling. Several initial projections to latent structures-regression (PLS-R) models for critical analytes and viral titre were built. These models allow you to regress multivariate Raman spectra against samples containing known concentrations of interesting analytes (viral titre). Based on these calculations the concentration of the analytes can be predicted in future. The models were prepared using a 10-fold cross validation procedure on the training data, i.e. $\frac{1}{10}^{th}$ of the data was randomly selected and removed from the training data and used to assess model performance, this was done 10 times and the error values, model accuracy/performance statistics are the averages obtained for each of the 10-fold training sets. Choosing the number of underlying components or basis vectors is an important step in building supervised linear models such as PLS-R. In this work the optimal number of underlying components was identified by examining plots of the mean squared error of prediction after cross-validation (MSECV) as a function of component number; a minimum identifies the optimal number of PLS components. A second stage of variable selection is required to optimise the models built by choosing only wavenumbers/variables that are most significant for prediction. This was carried out using the Variable Importance Projection (VIP) method. However, many methods of conducting variables selection exist. A typical VIP plot is shown in FIG. 18). Typically, variables with VIP values greater than 1 are used for the final model. However, here we have built and assessed models using several VIP thresholds to identify the minimum number of spectral variables required to make good predictions and the threshold at which one ceases to be able to model the offline RT-qPCR data. As the VIP threshold is increased the number of spectral variables identified decreases. Once the significant variables were determined for each VIP threshold, final models were built. Subsequently these models were used to predict the intermediate viral titre values, i.e. those between each offline data point for all available runs.

Preliminary Viral Titre Model Evaluation and Range Selection.

Figure 14:
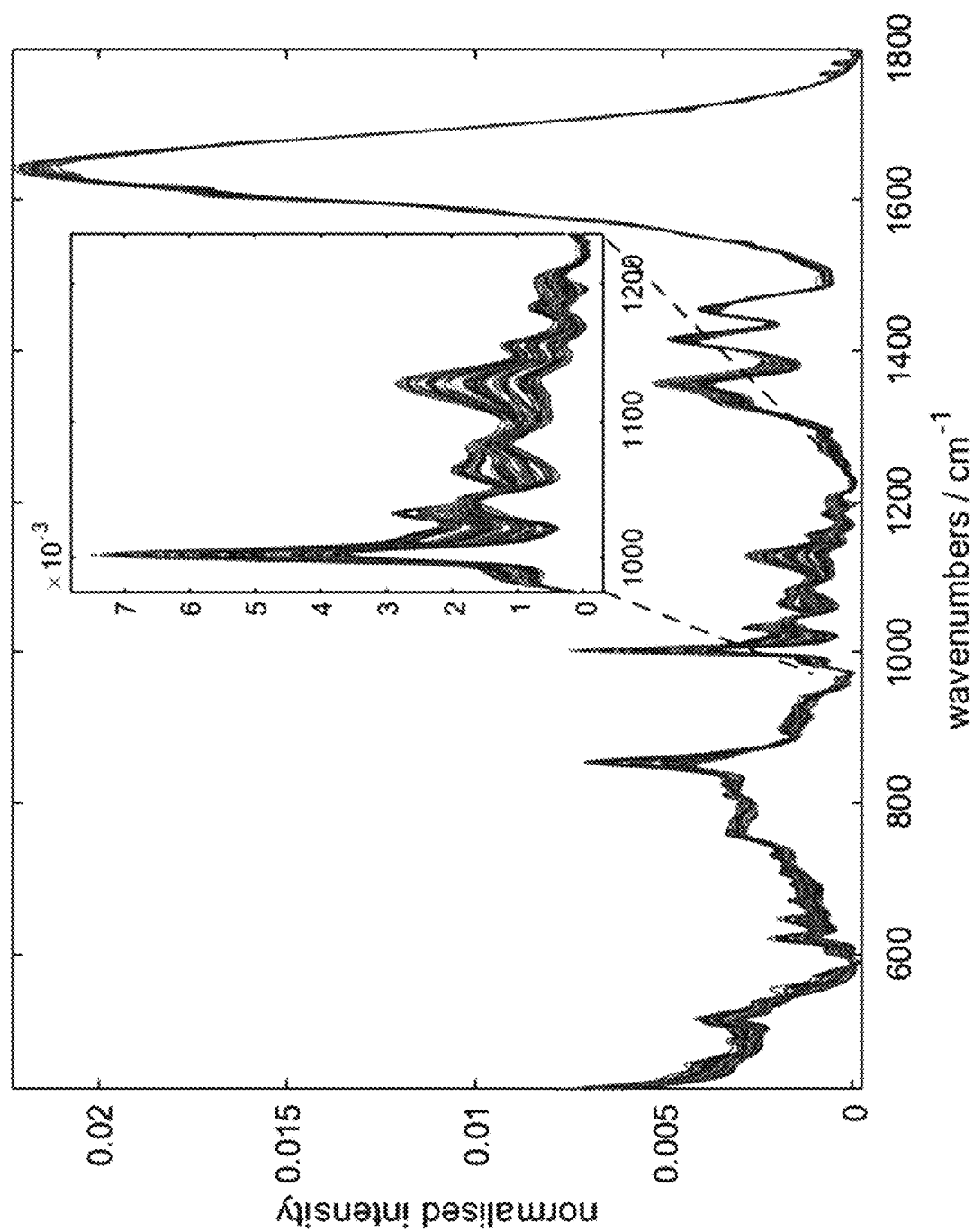
FIG. 14: Example pre-processed Raman spectra from an AAV Raman Project bioreactor run. Inset is a blow up of the 1000-1200 $cm^{-1}$ region. Spectra were acquired for 10 seconds with 75 accumulations, for a total integration time of ~12 mins 30 s, after CCD readout time approximately 15 minutes.

Example, pre-processed Raman spectra as used for the chemometric modelling of AAV are shown in FIG. 14).

Figure 15:
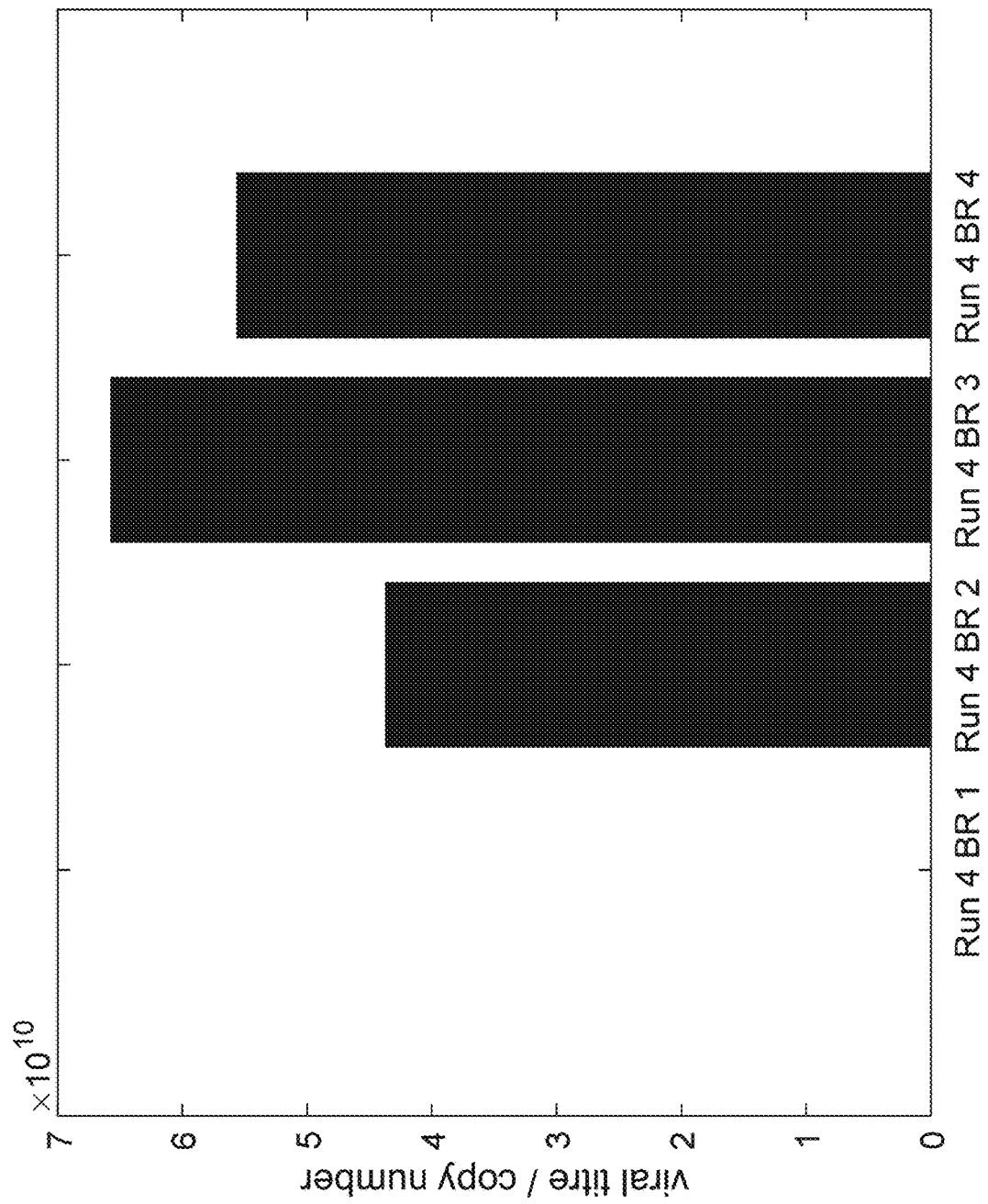
FIG. 15: Bar chart showing representative qPCR AAV viral titre results for bioreactor transfection in the AAV Raman project.

AAV titre was monitored throughout the project, a representative titre obtained by RT-qPCR is summarised in FIG. 15).

Figure 16:
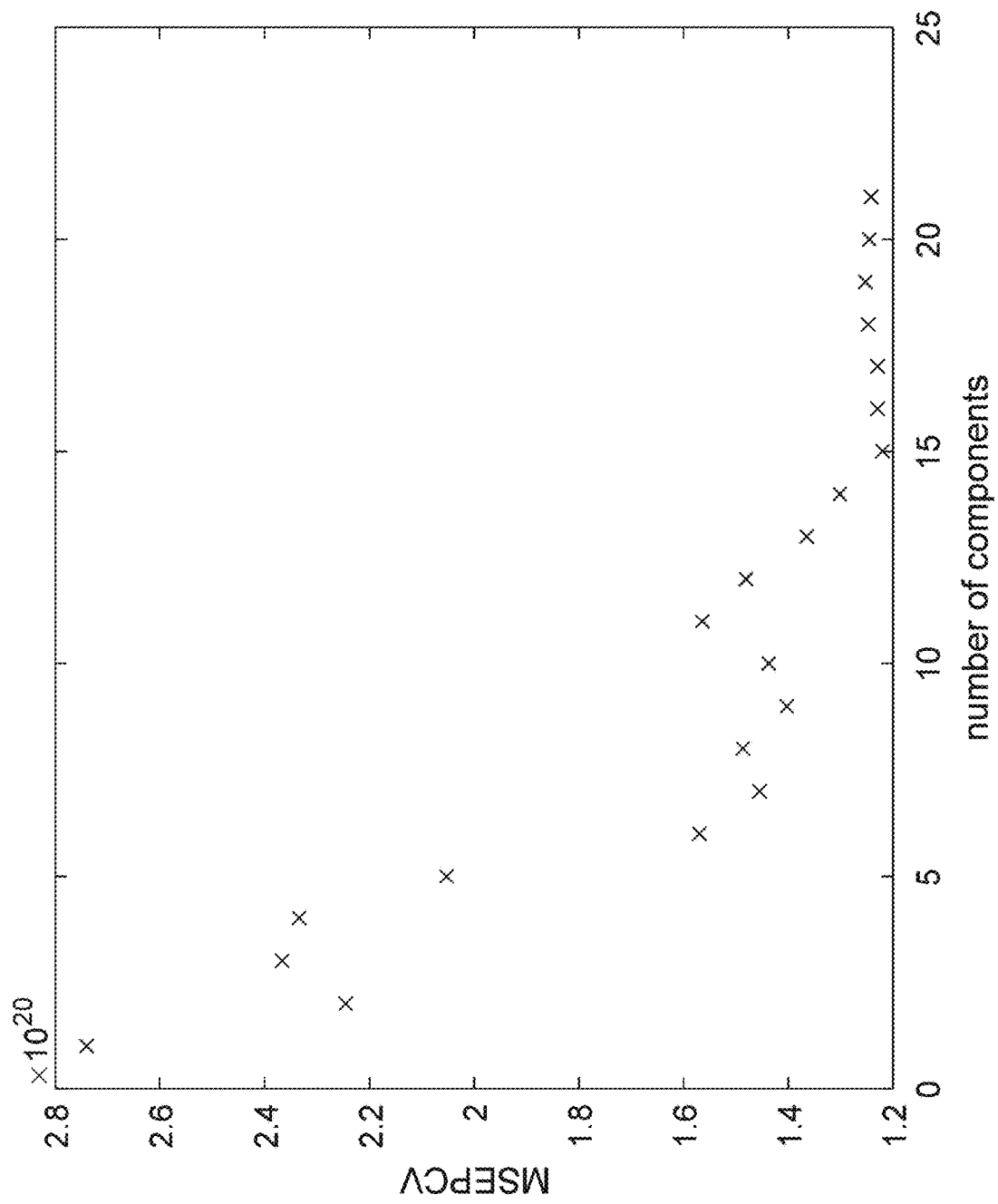
FIG. 16: A graph showing how the mean squared error of prediction (MSEPCV) after 10 fold cross validation and 20 monte carlo repeats varies as a function of the number of PLS latent variables/components (prior to spectral variable selection).

A plot of the mean squared error of prediction after cross-validation for the initial PLS-R model is shown in FIG. 16). When using all spectral variables or channels, the minimal effective prediction error was found to occur when 15 PLS components were used.

Figure 17A:
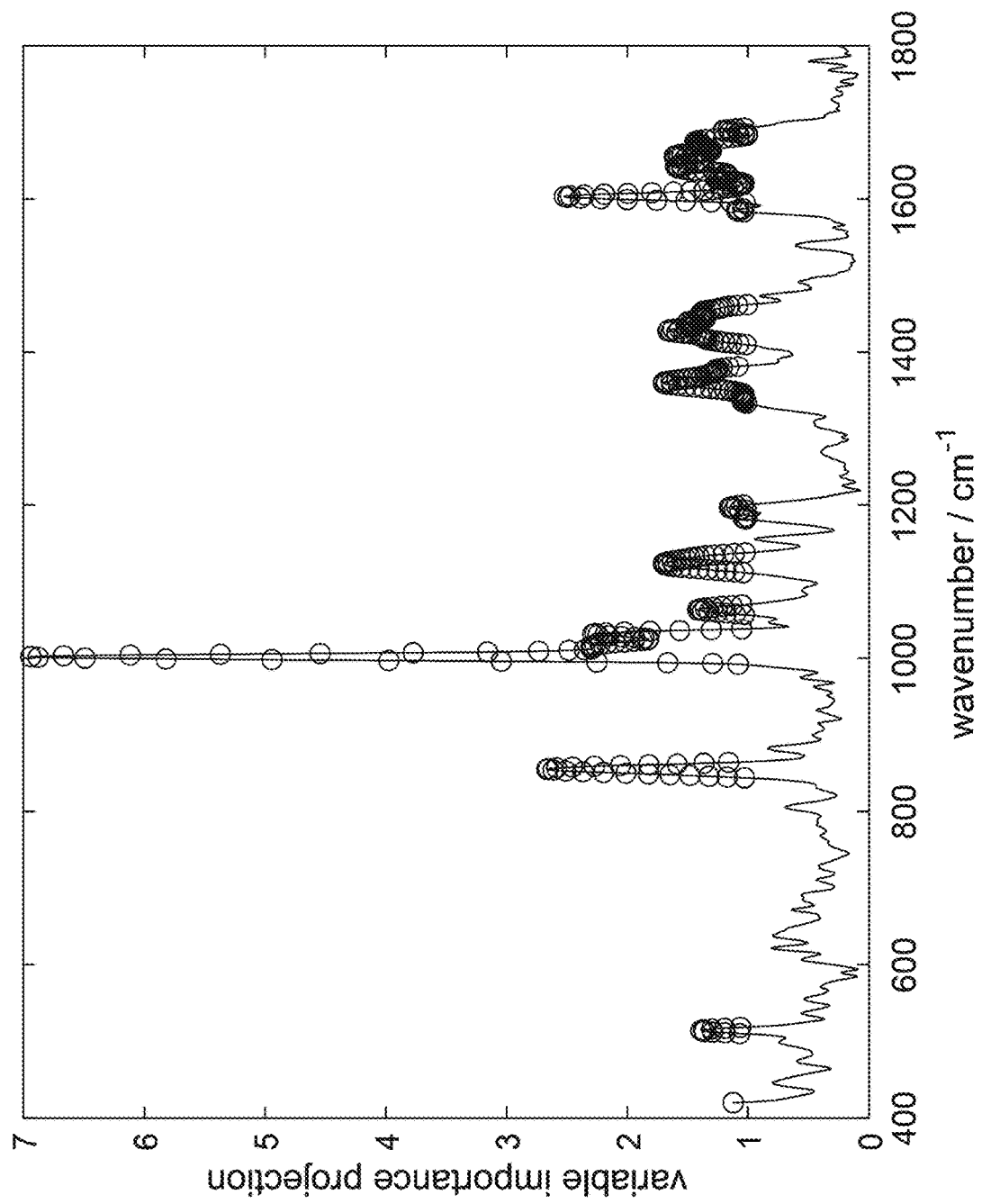
FIG. 17 (A): A plot of variable importance projection (VIP) calculated from the initial 15 component PLS-R model. The circles indicate spectral variables with VIP>=1.0 and this information was used to determine the ranges shown in FIG. 17 (B).

From this plot (FIG. 16) it therefore can be concluded that the best compromise between prediction error minimization and model simplicity lies in a 15-component model. Following preparation of the initial 15 component model different variable selection methods were evaluated to select the optimal/most predictive spectral variables for the final model. The aim here was to remove unnecessary spectral channels/variables from the model to enhance its parsimony and only include physically meaningful information. The variable importance projection (VIP) was finally calculated to determine which spectral variables have the greatest importance in predicting the viral copy number (FIG. 17)A). To assess and identify the minimum number of spectral variables required to make acceptable physical titre predictions, several variable importance thresholds were investigated as the criterion for retained variables; generally, a VIP threshold of 1 is used—thresholds of 1.00-1.75 were investigated. FIG. 17)B shows variable or wavenumber ranges that the VIP algorithm identifies as regions considered most important i.e. those greater than a selected threshold, in this case 1.0, FIG. 17)C shows these wavenumber ranges in order of importance.

After the number of spectral variables was reduced a further assessment of the number of underlying latent variables was carried out. The optimal number of PLS components can vary with the number of spectral variables or wavenumbers that are used in the model. After spectral variable reduction using a threshold of 1.0 the optimum number of PLS latent variables was found to be 9. FIG. 18) shows the MSECV plot for the refined models with different numbers of underlying components. The fact that the mean squared error of prediction increased with larger numbers of underlying components indicates that where more than 9 PLS components were included the models produced were overfitting the training set.

Figure 19:
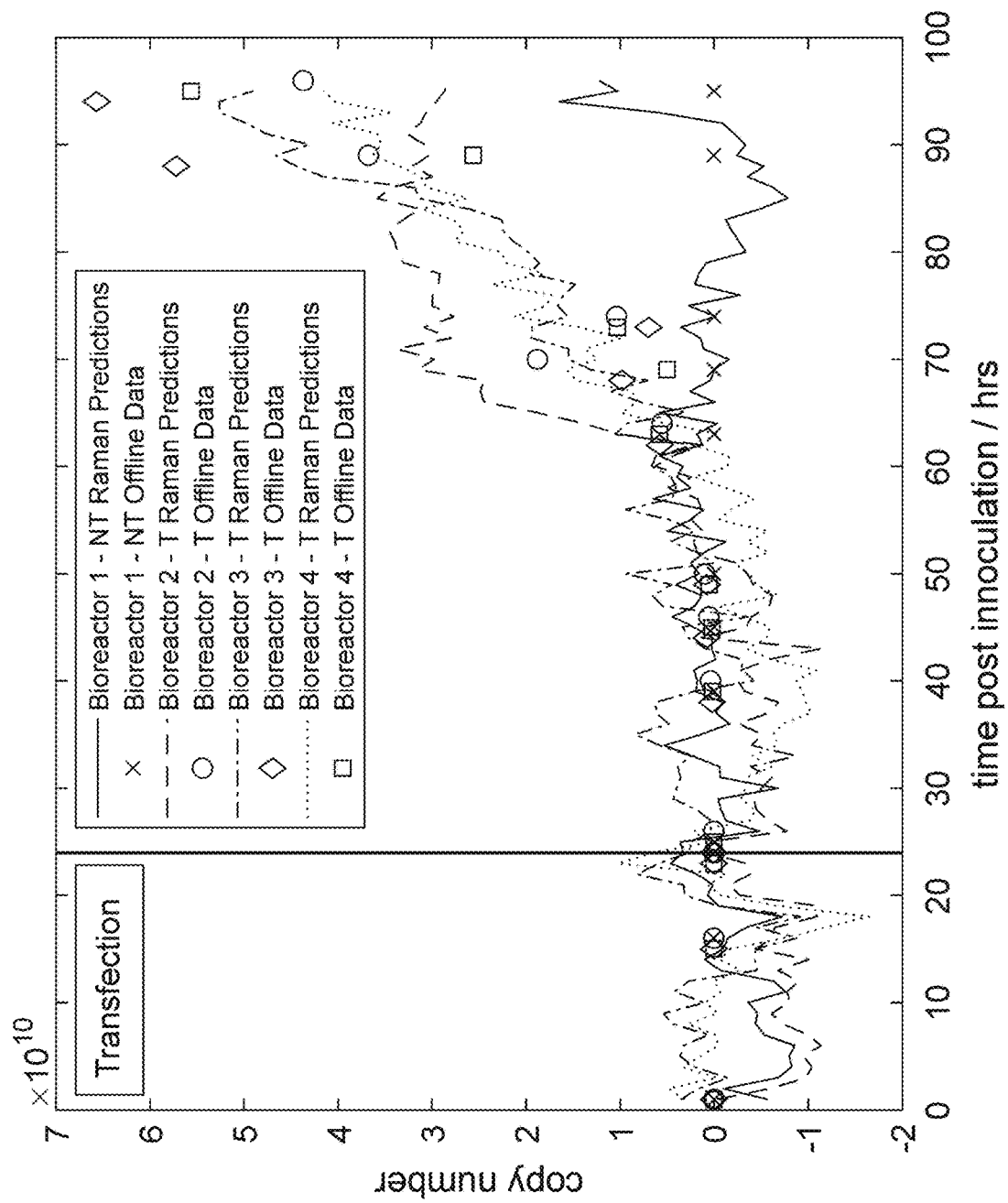
FIG. 19: A plot showing the Raman copy number PLS-R predictions (9 LV) from run 4 bioreactors 1-4 following spectral variable reduction alongside the offline qPCR data.

Model predictions of RT-qPCR viral copy number for the example run of 4 bioreactors estimated using the regression coefficients obtained from the 9-latent variable and VIP>1.0 selected spectral variable (conservative) model are shown below in FIG. 19). The results show that the model using the Raman spectroscopy data is consistent with offline measurements of viral titre over time.

Example 5—Refined Viral Titre Model Evaluation and Range Selection for AAV

A further analysis to that described in example 4 was performed to analyse the number of wavenumber ranges which can be used to provide an accurate estimate of AAV viral titre.

The ranges identified as important for viral vector production, i.e. the ranges identified as important by variable importance projection (VIP)≥1.00 after initial PLS modelling using the extended spectral range (~420-1800 cm-1), were identified (i.e. wavenumber ranges 1 to 12 as listed in Table 2 above) and further analysis was performed.

The data were split into randomly selected paired blocks of training and test data in a 4:1 ratio, that is Raman spectra and their associated offline viral titre data for model building (80%) and model testing (20%).

Figure 20:
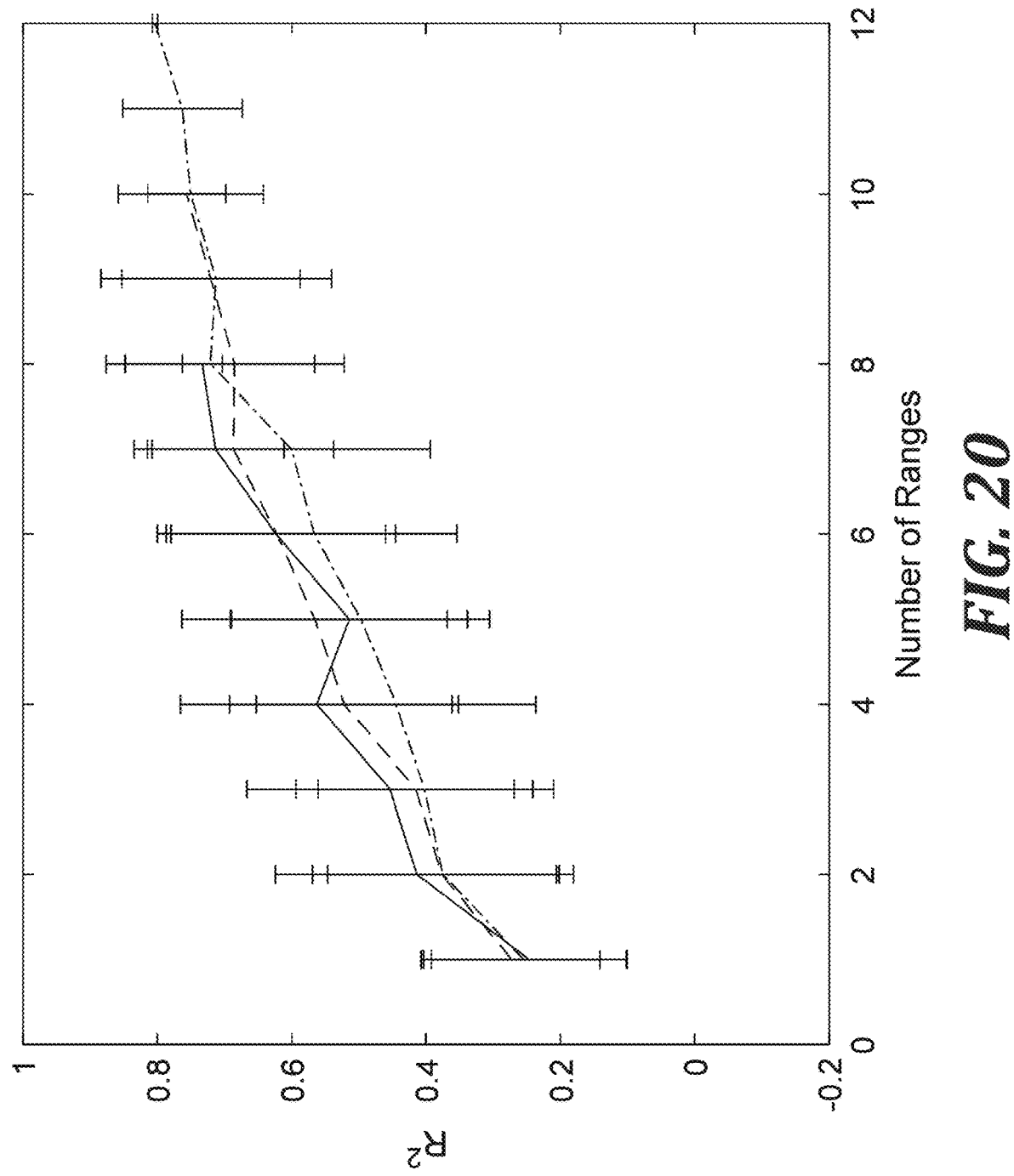
FIG. 20: A plot of $R^2$ (1−residual sum of squares/total sum of squares) as a function of the number of wavenumber ranges to demonstrate the minimum number of wavenumber ranges which are required to provide an estimate of AAV viral titre.

Different combinations of the ranges deemed important by VIP were evaluated stochastically for the different training and test pairs, i.e. for each r total number of ranges 1-(12), many combinations were evaluated based on the model performance $R^2$ statistic (n.b. $R^2$=1−residual sum of squares/total sum of squares) and the standard deviations of the different models' performances was evaluated to generate the confidence intervals. The minimum number of ranges was identified by choosing the number of ranges where the mean of mean $R^2$ values for several training/test pairs of data was approximately 0.5. FIG. 20 shows a plot of $R^2$ as a function of the number of wavenumber ranges.

This analysis identified four as being the minimum number of wavenumber ranges which are required to provide an estimate of AAV viral titre.

Thus, in any of the methods of the invention, 4 or more of wavenumber ranges 1 to 12 as presented in Table 2 identified at a VIP threshold of ≥1.00 may be used to calculate viral titre, as described in more detail herein. In any of these methods, preferably 6 or more of the wavenumber ranges may be used to calculate viral titre as described in more detail herein, more preferably 8 or more, or yet more preferably 10 or more, or most preferably all 12. In any of the methods of the invention, 4 or more of wavenumber ranges 13 to 22 as presented in Table 2 identified at a VIP threshold of ≥1.25 may be used to calculate viral titre, as described in more detail herein. In any of these methods, preferably 6 or more of the wavenumber ranges may be used to calculate viral titre as described in more detail herein, more preferably 8 or more, or most preferably all 10. In any of the methods of the invention, 4 or more of wavenumber ranges 23 to 30 as presented in Table 2 identified at a VIP threshold of ≥1.50 may be used to calculate viral titre, as described in more detail herein. In any of these methods, preferably 6 or more of the wavenumber ranges may be used to calculate viral titre as described in more detail herein, or most preferably all 8.

References

Barnes, R. J., Dhanoa, M. S. and Lister, S. J. Standard Normal Variate Transformation and De-trending of Near-Infrared Diffuse Reflectance Spectra. Applied Spectroscopy. 1989, 43(5): pp 772-777.

Buckley, K. and Ryder, A. G. Applications of Raman Spectroscopy in Biopharmaceutical Manufacturing: A Short Review. Applied Spectroscopy. 2017, 71(6): pp 1085-1116.

Hu H., Bai, J. Xia, G. Zhang, W. Ma, Y. Improved Baseline Correction Method Based on Polynomial Fitting for Raman Spectroscopy. Photonic Sensors. 2018, 8(4): pp 332-340.

Huang, J., Romero-Torres, S. and Moshgbar, M. Practical Considerations in Data Pre-treatment for NIR and Raman Spectroscopy. American Pharmaceutical Review. 2010.

Koch, M., Suhr, C., Roth, B. and Meinhardt-Wollweber, M. Iterative morphological and mollifier-based baseline correction for Raman spectra. Journal of Raman Spectroscopy. 2017, 48(2): pp 336-342.

Lee, J. H., Kim, B. C., Oh, B. K. and Choi, J. W. Rapid and Sensitive Determination of HIV-1 Virus Based on Surface Enhanced Raman Spectroscopy. J. Biomed. Nanotechnol. 2015, 11(12): pp 2223-2230.

Lieber, C. A. and Mahadevan-Jansen, A. Automated method for subtraction of fluorescence from biological Raman spectra. Applied Spectroscopy. 2003, 57(11): pp 1363-1367.

Savitzky, A. and Golay, M. J. E. Smoothing and Differentiation of Data by Simplified Least Squares Procedures. Analytical Chemistry. 1964, 36 (8): pp 1627-1639.

Wold, S., Sjostrom, M and Eriksson, L. PLS-regression: a basic tool of chemometrics. Chemometrics and Intelligent Laboratory Systems. 2001, 58: pp 109-130.

Zhang, Z. M., Chen, S. and Liang, Y. Z. Baseline correction using adaptive iteratively reweighted penalized least squares. Analyst. 2010, 135(5): pp 1138-1146.

Zhao, J., Lui, H., McLean, D. I. and Zeng, H. Automated autofluorescence background subtraction algorithm for biomedical Raman spectroscopy. Applied Spectroscopy. 2007, 61(11): pp 1225-32.

The invention claimed is:

1. A method of quantifying viral titre in a viral culture using Raman spectroscopy, the method comprising the steps of:
    (a) providing an unprocessed viral culture medium and irradiating the unprocessed viral culture medium with a light source;
    (b) measuring the total intensity of Raman scattered light within each one of a plurality of wavenumber ranges to obtain a wavenumber intensity data set for the viral culture medium, wherein the plurality of wavenumber ranges are pre-selected and are characteristic of the virus in the viral culture medium;
    (c) performing mathematical data processing steps on the wavenumber intensity data; and
    (d) quantifying the viral titre based upon the output of the mathematical data processing steps.

2. The method according to claim 1, wherein the steps of performing mathematical data processing and quantifying the viral titre comprise:
    obtaining model parameters by applying to the wavenumber signal intensity data a multivariate regression algorithm; and
    (ii) quantifying the viral titre using the model parameters obtained by applying the multivariate regression algorithm to the signal intensity data.

3. The method according to claim 2, wherein before step (i) the steps of performing mathematical data processing and quantifying the viral titre comprise normalising the wavenumber signal intensity data by pre-processing the signal intensity data using one or more pre-processing analytical methods.

4. The method according to claim 3, wherein the pre-processing analytical methods are a first derivative method, a second derivative method, a standard normal variate (SNV) method, a polynomial fitting method, a multi-polynomial fitting method, a mollifier method, a piecewise polynomial fitting (PPF) method or an adaptive iteratively reweighted Penalized Least Squares (airPLS) method.

5. The method according to claim 2, wherein the multivariate regression algorithm is a partial least squares (PLS) regression algorithm.

6. The method according to claim 5, wherein the PLS algorithm is a nonlinear iterative partial least squares (NIPALS) regression algorithm or a neural network.

7. The method according to claim 1, wherein the light source used to irradiate the viral culture medium is a laser and the viral culture medium is irradiated with light having a wavelength of 785 nm.

8. The method according to claim 1, wherein the Raman scattered light is detected using a charge-coupled device (CCD).

9. The method according to claim 1, wherein the plurality of wavenumber ranges in the Raman spectrum which are measured comprises 5 or more of the wavenumber ranges:
    (i) 420-438 $cm^{-1}$; (ii) 457-497 $cm^{-1}$; (iii) 503-552 $cm^{-1}$; (iv) 576-580 $cm^{-1}$; (v) 588-589 $cm^{-1}$;
    (vi) 604-608 $cm^{-1}$; (vii) 617-621 $cm^{-1}$; (viii) 796-805 $cm^{-1}$; (ix) 808-809 $cm^{-1}$; (x) 824-911 $cm^{-1}$;
    (xi) 918-939 $cm^{-1}$; (xii) 971-1168 $cm^{-1}$; (xiii) 1191-1197 $cm^{-1}$; (xiv) 1206-1212 $cm^{-1}$;
    (xv) 1234-1237 $cm^{-1}$; (xvi) 1246-1252 $cm^{-1}$; (xvii) 1259-1481 $cm^{-1}$; (xviii) 1497-1500 $cm^{-1}$;
    (xix) 1526-1540 $cm^{-1}$; (xx) 1545-1550 $cm^{-1}$; (xxi) 1584-1591 $cm^{-1}$; (xiii) 1598-1685 $cm^{-1}$;
    (xxiii) 1699-1699 $cm^{-1}$; (xxiv) 1717-1719 $cm^{-1}$; (xxv) 1754-1754 $cm^{-1}$; (xxvi) 1768-1771 $cm^{-1}$;
    (xxvii) 1782-1783 $cm^{-1}$ and (xxviii) 1789-1800 $cm^{-1}$;
    and wherein the variable importance projection (VIP) is ≥1.00; or wherein the plurality of wavenumber ranges in the Raman spectrum which are measured comprises 10 or more of the above wavenumber ranges and wherein the VIP is ≥1.00; or wherein the plurality of wavenumber ranges in the Raman spectrum which are measured comprises 15 or more of the above wavenumber ranges and wherein the VIP is ≥1.00; or wherein the plurality of wavenumber ranges in the Raman spectrum which are measured comprises 20 or more of the above wavenumber ranges and wherein the VIP is ≥1.00; or wherein the plurality of wavenumber ranges in the Raman spectrum which are measured comprises 25 or more of the above wavenumber ranges and wherein the VIP is ≥1.00; or wherein the plurality of wavenumber ranges in the Raman spectrum which are measured comprises all 28 of the above wavenumber ranges and wherein the VIP is ≥1.00.

10. The method according to claim 1, wherein the plurality of wavenumber ranges in the Raman spectrum which are measured comprises 5 or more of the wavenumber ranges:
    (i) 420-421 $cm^{-1}$; (ii) 426-429 $cm^{-1}$; (iii) 434-436; (iv) 459-486 $cm^{-1}$; (v) 490-496 $cm^{-1}$;
    (vi) 504-549 $cm^{-1}$; (vii) 798-800 $cm^{-1}$; (viii) 834-885 $cm^{-1}$; (ix) 892-907 $cm^{-1}$; (x) 919-938 $cm^{-1}$;
    (xi) 973-973 $cm^{-1}$; (xii) 981-983 $cm^{-1}$; (xiii) 990-1145 $cm^{-1}$; (xiv) 1207-1211 $cm^{-1}$;
    (xv) 1248-1250 $cm^{-1}$; (xvi) 1270-1322 $cm^{-1}$; (xvii) 1328-1331 $cm^{-1}$; (xviii) 1346-1380 $cm^{-1}$;
    (xix) 1383-1473 $cm^{-1}$; (xx) 1476-1478 $cm^{-1}$; (xxi) 1498-1499 $cm^{-1}$; (xxii) 1528-1528 $cm^{-1}$;
    (xxiii) 1590-1590 $cm^{-1}$; (xxiv) 1599-1602 $cm^{-1}$; (xxv) 1609-1613 $cm^{-1}$; (xxvi) 1616-1620 $cm^{-1}$;
    (xxvii) 1628-1634 $cm^{-1}$; (xxviii) 1640-1672 $cm^{-1}$; (xxii) 1678-1679 $cm^{-1}$; (xxx) 1769-1769 $cm^{-1}$ and (xxxi) 1800-1800 $cm^{-1}$;
    and wherein the variable importance projection (VIP) is ≥1.25; or wherein the plurality of wavenumber ranges in the Raman spectrum which are measured comprises 10 or more of the above wavenumber ranges and wherein the VIP is ≥1.25; or wherein the plurality of wavenumber ranges in the Raman spectrum which are measured comprises 15 or more of the above wavenumber ranges and wherein the VIP is ≥1.25; or wherein the plurality of wavenumber ranges in the Raman spectrum which are measured comprises 20 or more of the above wavenumber ranges and wherein the VIP is ≥1.25; or wherein the plurality of wavenumber ranges in the Raman spectrum which are measured comprises 25 or more of the above wavenumber ranges and wherein the VIP is ≥1.25; or wherein the plurality of wavenumber ranges in the Raman spectrum which are measured comprises 30 of the above wavenumber ranges and wherein the VIP is ≥1.25; or wherein the plurality of wavenumber ranges in the Raman spectrum which are measured comprises all 31 of the above wavenumber ranges and wherein the VIP is ≥1.25.

11. The method according to claim 1, wherein the plurality of wavenumber ranges in the Raman spectrum which are measured comprises 5 or more of the wavenumber ranges:
  (i) 420-420 $cm^{-1}$; (ii) 467-471 $cm^{-1}$; (iii) 474-481 $cm^{-1}$; (iv) 505-529 $cm^{-1}$; (v) 537-543 $cm^{-1}$;
  (vi) 836-884 $cm^{-1}$; (vii) 897-902 $cm^{-1}$; (viii) 919-937 $cm^{-1}$; (ix) 995-1043 $cm^{-1}$; (x) 1046-1046 $cm^{-1}$;
  (xi) 1049-1071 $cm^{-1}$; (xii) 1084-1144 $cm^{-1}$; (xiii) 1209-1210 $cm^{-1}$; (xiv) 1271-1273 $cm^{-1}$;
  (xv) 1277-1302 $cm^{-1}$; (xvi) 1347-1366 $cm^{-1}$; (xvii) 1386-1433 $cm^{-1}$; (xviii) 1444-1461 $cm^{-1}$;
  (xix) 1467-1469 $cm^{-1}$; (xx) 1610-1612 $cm^{-1}$; (xxi) 1629-1630 $cm^{-1}$ and (xxii) 1655-1671 $cm^{-1}$;
  and wherein the variable importance projection (VIP) is ≥1.50; or wherein the plurality of wavenumber ranges in the Raman spectrum which are measured comprises 10 or more of the above wavenumber ranges and wherein the VIP is ≥1.50; or wherein the plurality of wavenumber ranges in the Raman spectrum which are measured comprises 15 or more of the above wavenumber ranges and wherein the VIP is ≥1.50; or wherein the plurality of wavenumber ranges in the Raman spectrum which are measured comprises 20 or more of the above wavenumber ranges and wherein the VIP is ≥1.50, or wherein the plurality of wavenumber ranges in the Raman spectrum which are measured comprises all 22 of the above wavenumber ranges and wherein the VIP is ≥1.50.

12. The method according to claim 1, wherein the viral titre measured is physical viral titre.

13. The method according to claim 1, wherein the viral titre measured is functional viral titre.

14. The method according to claim 1, wherein the viral titre measured is lentiviral titre.

15. The method according to claim 1, wherein the viral titre measured is not the titre of HIV-1 or HIV-1 virus-like particles (HIV-1 VLPs).

16. The method according to claim 1, wherein the Raman spectroscopy is not surface enhanced Raman spectroscopy.

17. The method according to claim 1, wherein the viral titre is quantified from a wavenumber intensity data set obtained from the viral culture in situ.

18. The method according to claim 1, the method comprising a first step of quantifying the viral titre in the viral culture medium at a first time point and one or more further steps of quantifying the viral titre in the viral culture medium at later time points, and further comprising measuring the change in viral titre in the viral culture medium between time points.

19. The method according to claim 18, wherein viral titre is quantified repeatedly over a time period to provide a measure of the change in viral titre in real time.

20. The method according to claim 18, wherein the change in viral titre in the viral culture medium is used to determine the start phase, the production phase and/or the stationary phase of a viral production process.

21. The method according to claim 1, wherein the method is used to assess a process downstream of a viral production process.

22. The method according to claim 1, wherein the method comprises a step of comparing the viral titre thereby obtained with the viral titre obtained from the same viral culture medium by an alternative method.

23. The method according to claim 22, wherein the alternative method is RT-qPCR or p24 ELISA.

24. A method of determining the extent of viral infection in an individual using Raman spectroscopy, the method comprising quantifying viral titre in a sample by performing the method of claim 1, wherein the sample is a sample which has previously been obtained from the individual.

25. The method according to claim 24, wherein the sample is a sample of blood, saliva, sputum, plasma, serum, cerebrospinal fluid, urine or faeces.

26. The method according to claim 24, wherein the viral titre in the sample from the subject is compared with one or more viral titre measurements which have previously been obtained for the infection in the individual, in order to provide a prognosis of the stage of infection in the individual.

27. A method of quantifying viral titre in a viral culture using Raman spectroscopy, the method comprising the steps of: (a) providing a wavenumber intensity data set for the viral culture, wherein the data set has been obtained by irradiating an unprocessed viral culture medium with a light source and measuring the total intensity of Raman scattered light within each one of a plurality of wavenumber ranges, wherein the plurality of wavenumber ranges in the Raman spectrum have been selected as characteristic of the virus in the viral culture medium; (b) performing mathematical data processing steps on the wavenumber intensity data; and (c) quantifying the viral titre based upon the output of the mathematical data processing steps.

28. The method according to claim 27, wherein the steps of performing mathematical data processing and quantifying the viral titre comprise:
  (i) obtaining model parameters by applying to the wavenumber signal intensity data a multivariate regression algorithm; and
  (ii) quantifying the viral titre using the model parameters obtained by applying the multivariate regression algorithm to the signal intensity data.

29. A method of building a multivariate data processing model which is capable of providing a quantification of viral titre in a viral culture from a Raman spectroscopy wavenumber intensity data set obtained for the viral culture, the method comprising (a) providing the viral culture and irradiating an unprocessed viral culture medium with a light source; (b) measuring the total intensity of the Raman scattered light within each one of a plurality of wavenumber ranges to obtain a wavenumber intensity data set for the viral culture; (c) obtaining normalized wavenumber signal intensity data by pre-processing the signal intensity data using a pre-processing analytical method; (d) obtaining model parameters by applying to the pre-processed signal intensity data a multivariate regression algorithm, wherein a calibration is performed wherein the pre-processed signal intensity data are compared with viral titre data obtained for the same viral culture conditions using non-Raman spectroscopy methods; (e) inferring response values using the model parameters obtained from the pre-processed data; and (f) performing variable selection, and identifying Raman spectral variables; and wherein viral titre in a viral culture is quantified using the model parameters obtained for the identified Raman spectral variables derived from the multivariate data processing model.

* * * * *